(12) United States Patent
Tanaka et al.

(10) Patent No.: US 11,397,261 B2
(45) Date of Patent: Jul. 26, 2022

(54) IMAGE PROCESSING APPARATUS, IMAGE PROCESSING METHOD, IMAGE PROCESSING PROGRAM, AND IMAGE PROCESSING SYSTEM

(71) Applicant: NEC Corporation, Tokyo (JP)

(72) Inventors: Taichi Tanaka, Tokyo (JP); Osamu Hoshuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 110 days.

(21) Appl. No.: 16/759,887

(22) PCT Filed: Oct. 4, 2018

(86) PCT No.: PCT/JP2018/037234
§ 371 (c)(1),
(2) Date: Apr. 28, 2020

(87) PCT Pub. No.: WO2019/087673
PCT Pub. Date: May 9, 2019

(65) Prior Publication Data
US 2021/0181336 A1 Jun. 17, 2021

(30) Foreign Application Priority Data
Oct. 30, 2017 (JP) .............................. JP2017-209287

(51) Int. Cl.
*G01S 13/90* (2006.01)

(52) U.S. Cl.
CPC ................. *G01S 13/9027* (2019.05)

(58) Field of Classification Search
CPC .. G01S 13/9027; G01S 13/9023; G01S 13/90; G06K 17/0029; G06K 9/627; G06T 5/002
See application file for complete search history.

(56) References Cited

U.S. PATENT DOCUMENTS 9,389,311 B1 * 7/2016 Moya ................... G01S 13/9023
2006/0245660 A1 * 11/2006 Hung ..................... H04N 5/217
382/254

(Continued)

FOREIGN PATENT DOCUMENTS

| JP | 2006-221520 A | 8/2006 |
| WO | 00/72045 A1 | 11/2000 |
| WO | 2018/123748 A1 | 7/2018 |

OTHER PUBLICATIONS

D. D'Aria, A. Ferretti, A. Monti Guarnieri and S. Tebaldini, "SAR Calibration Aided by Permanent Scatterers," in IEEE Transactions on Geoscience and Remote Sensing, vol. 48, No. 4, pp. 2076-2086, Apr. 2010, doi: 10.1109/TGRS.2009.2033672. (Year: 2009).*

(Continued)

*Primary Examiner* — Thomas M Hammond, III
*Assistant Examiner* — Ismaaeel A. Siddiquee

(57) ABSTRACT

Persistent scatterers on images and a target object are readily associated with each other. There is provided an image processing apparatus including a persistent scatterer specifier, a phase acquirer, and a clustering unit. The persistent scatterer specifier of the image processing apparatus specifies persistent scatterers at which reflection is stable in a plurality of images. The phase acquirer of the image processing apparatus acquires phases of the specified persistent scatterers. The clustering unit of the image processing apparatus clusters the persistent scatterers based on the positions of the persistent scatterers and the phases.

13 Claims, 23 Drawing Sheets

(56) References Cited

U.S. PATENT DOCUMENTS

| | | | |
|---|---|---|---|
| 2011/0163911 A1* | 7/2011 | Costantini | G01S 13/9023 |
| | | | 342/25 C |
| 2013/0142438 A1* | 6/2013 | Schloegel | G06T 17/005 |
| | | | 382/199 |
| 2013/0156340 A1* | 6/2013 | Porikli | G06T 5/002 |
| | | | 382/275 |
| 2015/0323666 A1* | 11/2015 | Murata | G01S 7/025 |
| | | | 342/25 C |
| 2019/0354860 A1* | 11/2019 | Karg | B60Q 9/00 |

OTHER PUBLICATIONS

A. Ferretti, A. Monti-Guarnieri, C. Prati and F. Rocca, "Multi-image DEM reconstruction," IGARSS '98. Sensing and Managing the Environment. 1998 IEEE International Geoscience and Remote Sensing. Symposium Proceedings. (Cat. No.98CH36174), 1998, pp . 1367-1369 vol.3, doi: 10.1109/IGARSS.1998.691426. (Year: 1998).*

D. Perissin and A. Ferretti, "Urban-Target Recognition by Means of Repeated Spaceborne SAR Images," in IEEE Transactions on Geoscience and Remote Sensing, vol. 45, No. 12, pp. 4043-4058, Dec. 2007, doi: 10.1109/TGRS.2007.906092. (Year: 2007).*

Tanaka, Taichi, Hoshuyama, Osamu, "Persistent Scatterer Clustering Using Phase Correlation Graph for Structure Displacement Analysis", Mar. 7, 2017, B-2-49, p. 224, ISSN:I349-1369, non-official translation (Proceedings of the 2017 IEICE General Conference: Communication 1), Japan.

Michaelsen, Eckart, et al., "Utilizing Phase for the Grouping of PS in Urban High-Resolution in-SAR-Images", Joint Urban Remote Sensing Event(JURSE 2011), Apr. 13, 2011, pp. 189-192, Munich Germany.

Girolami, Mark, "Mercer Kernel-Based Clustering in Feature Space", IEEE Transactions on Neural Networks, May 2002, vol. 13, No. 3, pp. 780-784, DOI:10.1109/TNN.2002.1000150.

Grygorash, Oleksandr et al., "Minimum Spanning Tree Based Clustering Algorithms", Proceedings of the 18th IEEE International Conference on Tools with Artifical Intelligence (ICTAI'06), Oct. 2006, ISBN: 0-7695-2728-0, DOI:10.1109/ICTAI.2006.83, USA.

Tanaka et al., "Persistent Scatterer Clustering for Structure Displacement Analysis Based on Phase Correlation Network", 2017 IEEE International Geoscience and Remote Sensing Symposium (IGARSS), Dec. 4, 2017, pp. 1618-4621, ISSN: 2153-7003.

Tanaka, Taichi, Hoshuyama, Osamu, "Clustering Technique to Grasp Distribution Shape of Persistent Scatterers Using Correlation Kernel", Mar. 6, 2018, B-2-28, p. 187, ISSN: 1349-1369, non-official translation (Proceedings of the 2018 IEICE General Conference: Communication 1), Japan.

Lu, Ping, "Persistent Scatterers Interferometry Hotspot and Cluster Analysis (PSI-HCA) for detection of extremely slow-moving landslides", International Journal of Remote Sensing, Jan. 20, 2012, vol. 33, No. 2, pp. 466-489, Florence Italy.

Schunert, Alexander, et al., "Grouping of Persistent Scatterers in high-resolution SAR data of urban scenes", SPRS Journal of Photogrammetry and Remote Sensing, 2012, vol. 73, pp. 80-88.

International Search Report for PCT Application No. PCT/JP2018/037234, dated Dec. 25, 2018.

* cited by examiner

| 801 | 423 | 424 | 425 | 811 |
|---|---|---|---|---|
| | PERSISTENT SCATTERER ID | POSITION | PHASE ARRAY | GENERATED GRAPH |
| | | | | |
| | | | | |
| | ⋮ | ⋮ | ⋮ | |

FIG. 8A

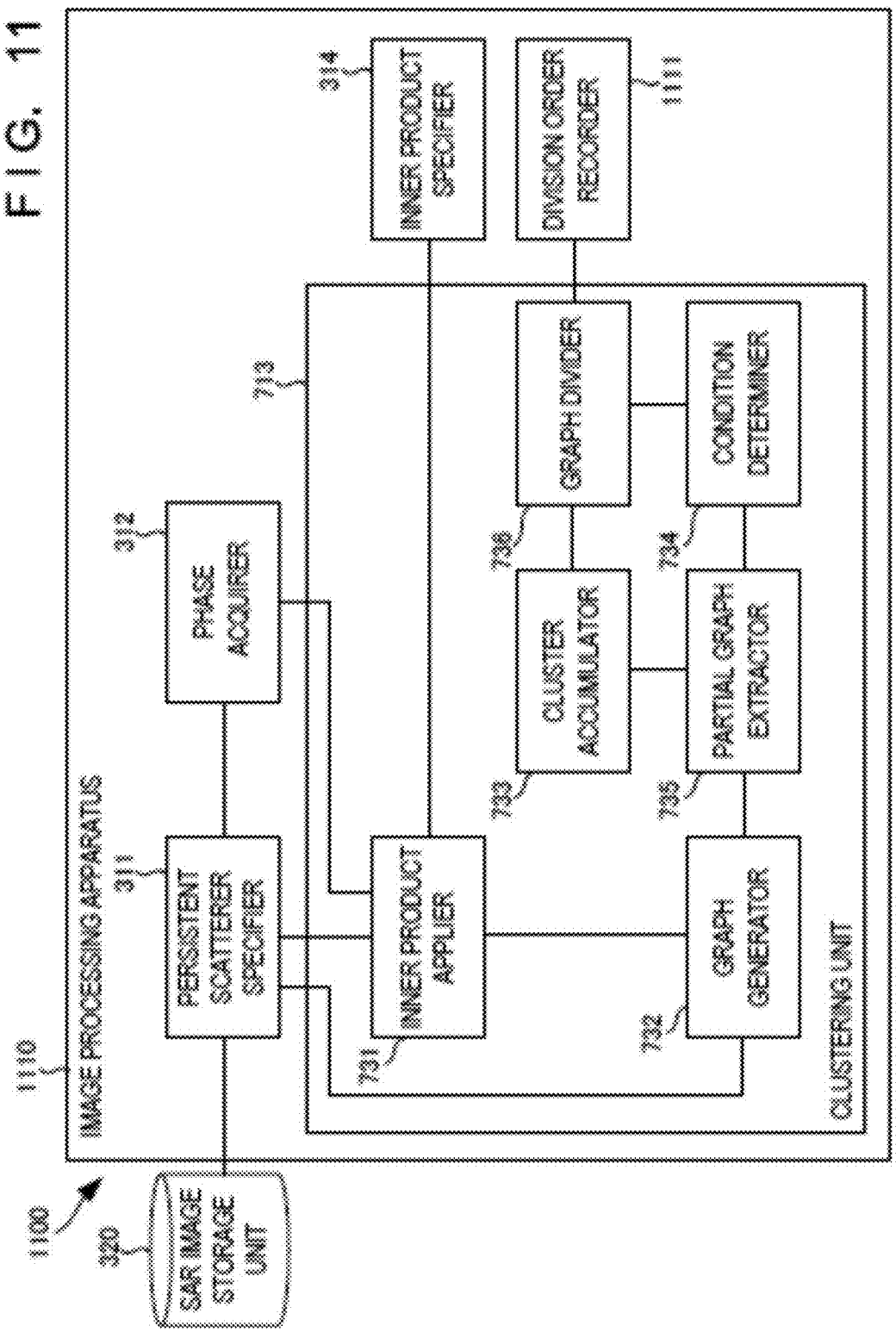

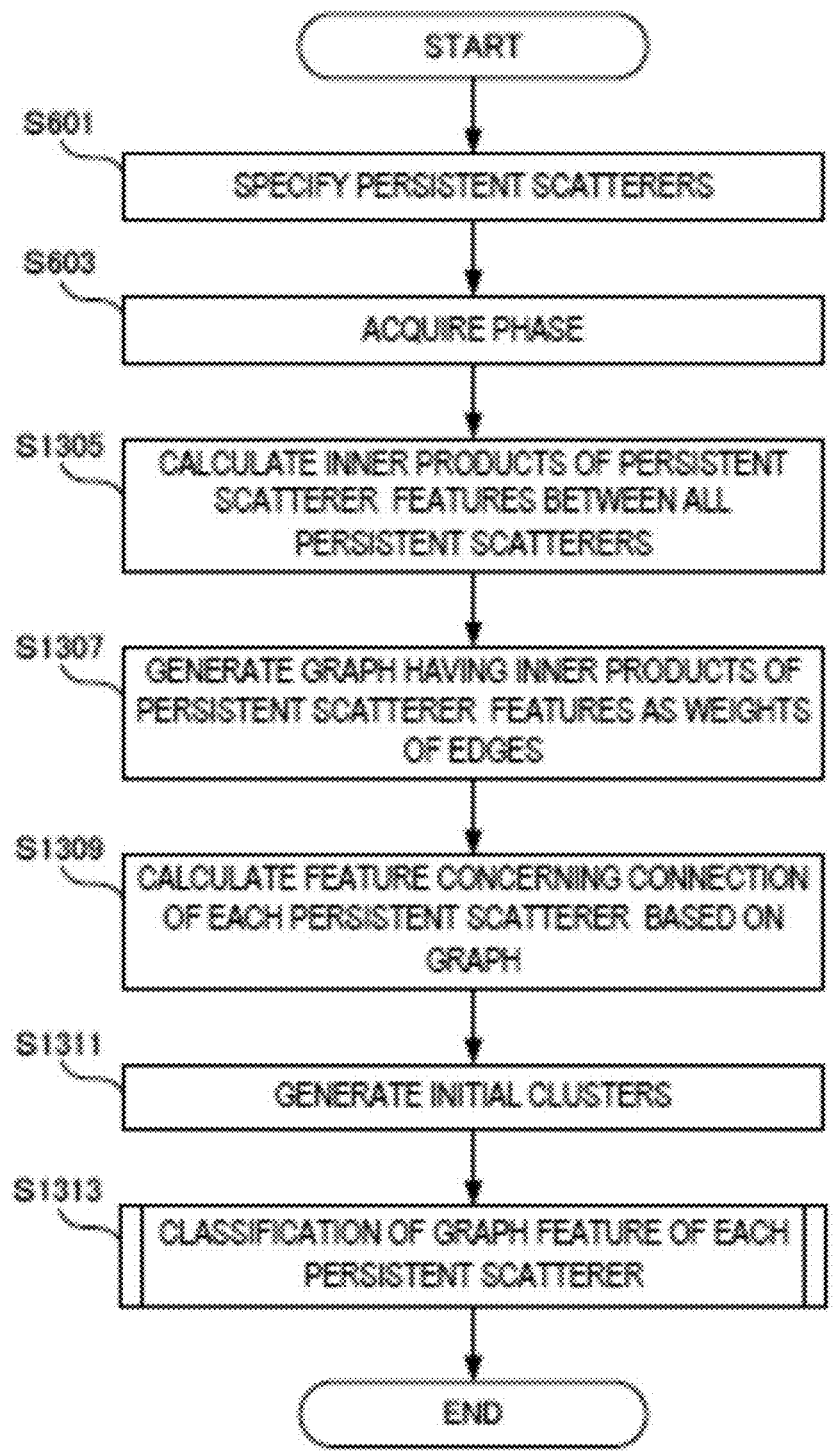
F I G. 13A

IMAGE PROCESSING APPARATUS, IMAGE PROCESSING METHOD, IMAGE PROCESSING PROGRAM, AND IMAGE PROCESSING SYSTEM

This application is a National Stage Entry of PCT/JP2018/037234 filed on Oct. 4, 2018, which claims priority from Japanese Patent Application 2017-209287 filed on Oct. 30, 2017, the contents of all of which are incorporated herein by reference, in their entirety.

TECHNICAL FIELD

The present invention relates to an image processing apparatus, an image processing method, an image processing program, and an image processing system.

BACKGROUND ART

In the above technical field, patent literature 1 discloses a technique of outputting the positions of persistent scatterers and a displacement and an elevation at each of persistent scatterers in a SAR (Synthetic Aperture RADAR) image analysis system.

CITATION LIST

Patent Literature

Patent literature 1: WO 00/72045

SUMMARY OF THE INVENTION

Technical Problem

In the technique described in the above literature, however, it is difficult to associate persistent scatterers on images and a target object with each other.

The present invention provides a technique of solving the above-described problem.

Solution to Problem

One example aspect of the present invention provides an image processing apparatus comprising:
a persistent scatterer specifier that specifies persistent scatterers at which reflection is stable in a plurality of images and positions of the persistent scatterers;
a phase acquirer that acquires phases of the specified persistent scatterers; and
a clustering unit that clusters the persistent scatterers based on the positions of the persistent scatterers and the phases.

Another example aspect of the present invention provides an image processing method comprising:
specifying persistent scatterers at which reflection is stable in a plurality of images and positions of the persistent scatterers;
acquiring phases of the specified persistent scatterers; and
clustering the persistent scatterers based on the positions of the persistent scatterers and the phases.

Still other example aspect of the present invention provides an image processing program for causing a computer to execute a method, comprising:
specifying persistent scatterers at which reflection is stable in a plurality of images and positions of the persistent scatterers;
acquiring phases of the specified persistent scatterers; and
clustering the persistent scatterers based on the positions of the persistent scatterers and the phases.

Still other example aspect of the present invention provides an image processing system comprising:
an image capturer that captures a plurality of images;
a storage unit that stores captured images;
an acquirer that acquires a plurality of images;
a persistent scatterer specifier that specifies persistent scatterers at which reflection is stable in a plurality of images and positions of the persistent scatterers;
a phase acquirer that acquires phases of the specified persistent scatterers; and
a clustering unit that clusters the persistent scatterers based on the positions of the persistent scatterers and the phases.

Advantageous Effects of Invention

According to the present invention, it is possible to readily associate persistent scatterers on images and a target object with each other.

BRIEF DESCRIPTION OF DRAWINGS

FIG. 8A is a table showing an example of a generated graph table held by an image processing apparatus included in the image processing system according to the third example embodiment of the present invention;

FIG. 11 is a block diagram showing the arrangement of an image processing system according to the fourth example embodiment of the present invention;

FIG. 13A is a flowchart for explaining the processing procedure of an image processing apparatus included in the image processing system according to the fifth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An image processing apparatus 100 according to the first example embodiment of the present invention will be described with reference to FIG. 1. The image processing apparatus 100 is an apparatus that clusters persistent scatterers on images.

Figure 1:
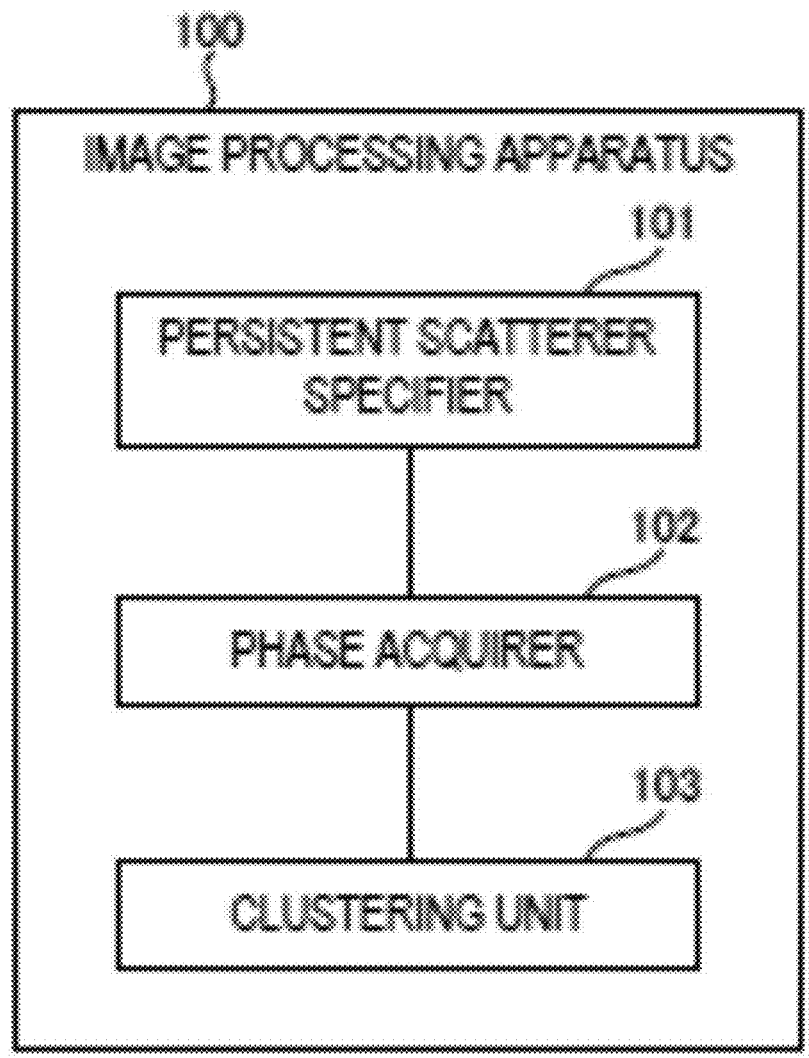
FIG. 1 is a block diagram showing the arrangement of an image processing apparatus according to the first example embodiment of the present invention.

As shown in FIG. 1, the image processing apparatus 100 includes a persistent scatterer specifier 101, a phase acquirer 102, and a clustering unit 103. The persistent scatterer specifier 101 specifies persistent scatterers at which reflection is stable in a plurality of images and the positions of the persistent scatterers. The phase acquirer 102 acquires the phases of the specified persistent scatterers. The clustering unit 103 clusters the persistent scatterers based on the positions of the persistent scatterers and the phases.

According to this example embodiment, since persistent scatterers are clustered, it is possible to readily associate persistent scatterers on images and a target object with each other.

Second Example Embodiment

An image processing apparatus according to the second example embodiment of the present invention will be described next with reference to FIGS. 2A to 6.

Technical Premise

Figure 2A:
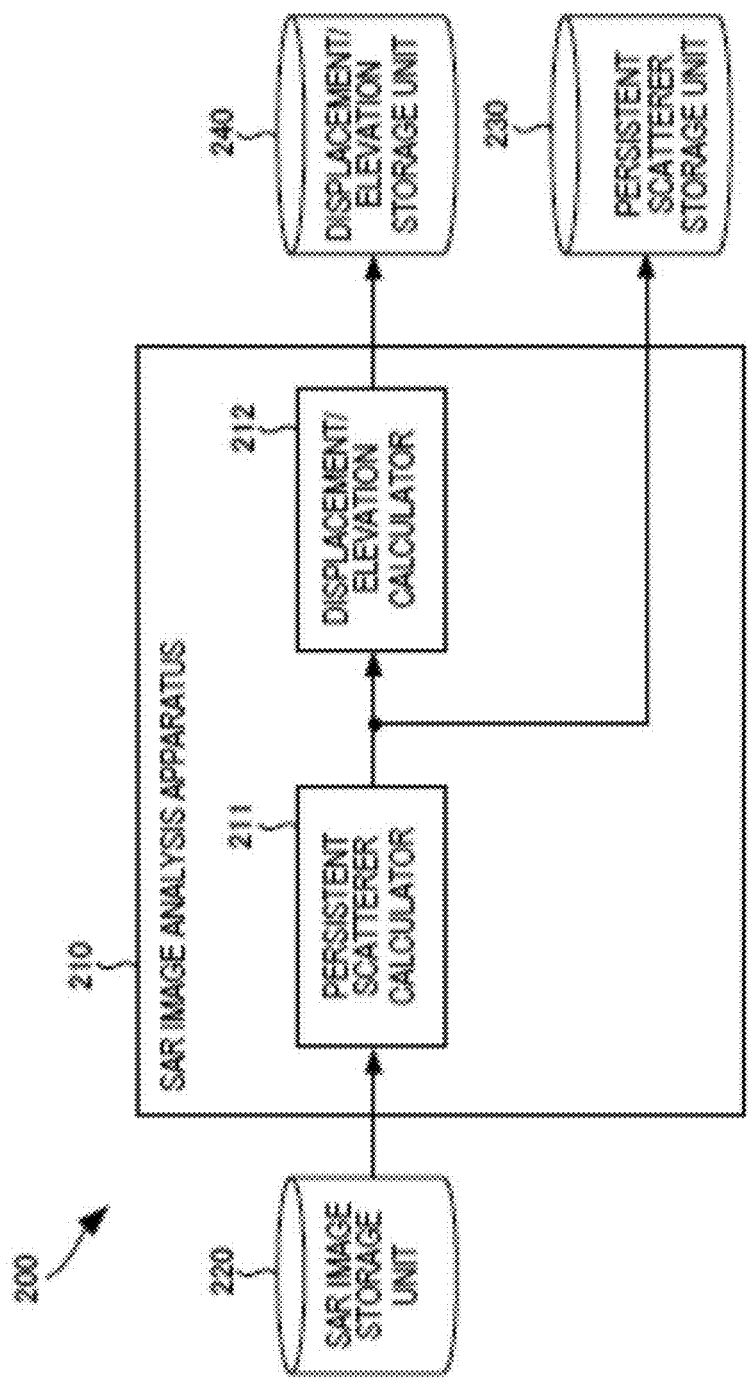
FIG. 2A is a block diagram showing an example of the arrangement of an image processing apparatus according to a technical premise.
Figure 2B:
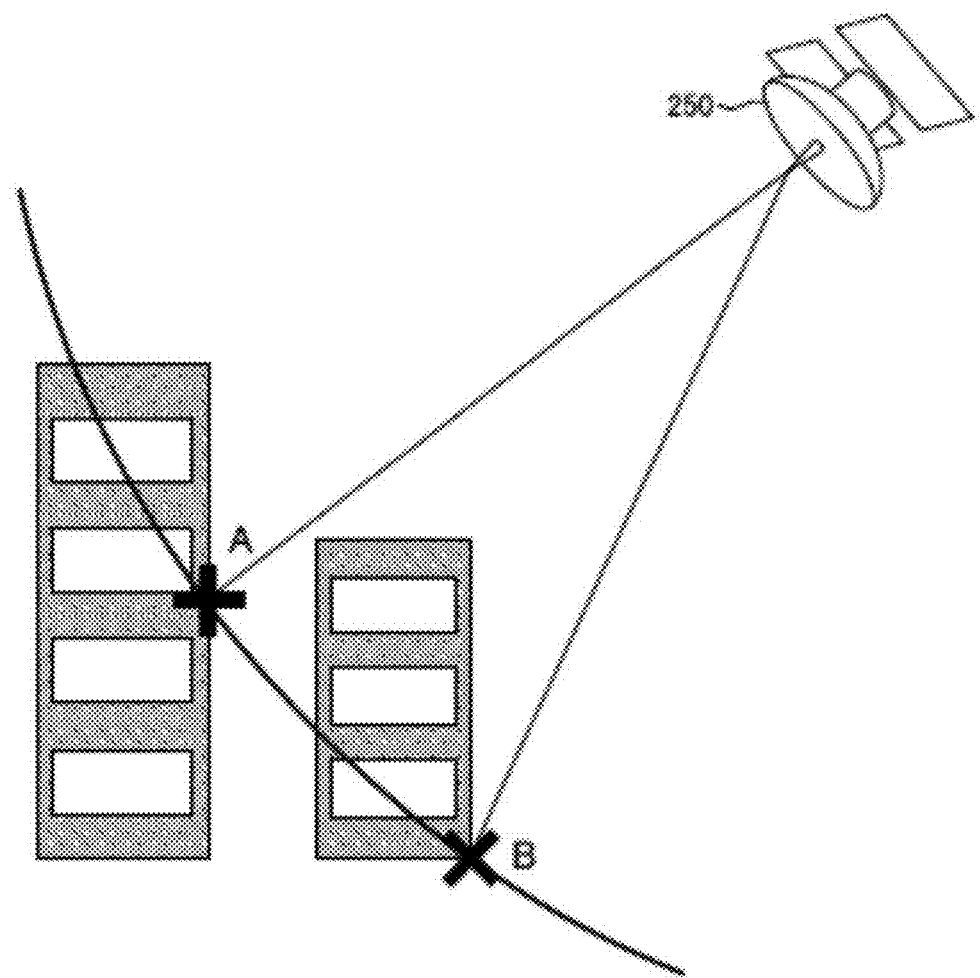
FIG. 2B is a view for explaining the principle of layover occurring in the image processing apparatus according to the technical premise.

FIG. 2A is a block diagram showing an example of the arrangement of an image analysis system according to a technical premise. FIG. 2B is a view for explaining the principle of layover occurring in an image analysis apparatus according to the technical premise. An example of a SAR image analysis system 200 according to the technical premise is described in patent literature 1. As shown in FIG. 2A, the SAR image analysis system 200 includes a SAR image analysis apparatus 210, a SAR image storage unit 220, a persistent scatterer storage unit 230, and a displacement/elevation storage unit 240. The SAR image analysis apparatus 210 includes a persistent scatterer calculator 211 and a displacement/elevation calculator 212.

The SAR image analysis apparatus 210 operates as follows. To analyze differences in phase observed at the same point among a plurality of SAR images, the persistent scatterer calculator 211 acquires, from the SAR image storage unit 220, a plurality of SAR images obtained by capturing the same place at different times. The persistent scatterer calculator 211 calculates persistent scatterers from the plurality of acquired SAR images. The calculated persistent scatterers are stored in, for example, the persistent scatterer storage unit 230.

The persistent scatterer indicates a pixel in which stable reflection is obtained over a plurality of SAR images. For example, in patent literature 1, a pixel in which a luminance is stable and an image in which a phase is stable are used as persistent scatterers.

Next, the displacement/elevation calculator 212 receives the persistent scatterers calculated by the persistent scatterer calculator 211, and calculates a displacement and an elevation at each persistent scatterer. The calculated displacement and elevation are stored in, for example, the displacement/elevation storage unit 240.

The SAR image analysis system 200 has a problem that it is difficult to find a specific target object (for example, a building, bridge, road, or ground) with which persistent scatterers calculated on SAR images are associated. There are the following two main causes of this problem.

The first cause is that due to the influence of a phenomenon called layover or laying down unique to SAR images, a plurality of persistent scatterers at places geographically away from each other are mixed at the same place on the SAR images and calculated. This phenomenon occurs because the SAR is an observation means that acquires information corresponding to a distance between an antenna and a reflector.

Layover indicates a phenomenon in which the wall of a building or a steep slope (a surface opposing a microwave having a slope steeper than an incident angle) is upside down on an image and a highlight-detail loss occurs since an upper portion is closer to the antenna than a lower portion (the upper portion is normally farther from the antenna). Laying down indicates a phenomenon in which a high building or mountain is displayed at a position closer to the antenna than an actual plane position (fore-shortening).

Since persistent scatterers, shown in FIG. 2B, calculated at places A and B are equidistant from the antenna of a SAR satellite 250, layover occurs, and the persistent scatterers are unwantedly superimposed at the same place on SAR images and calculated. If this occurs, it becomes extremely difficult to associate the persistent scatterers calculated on the SAR images with geographical places.

The second cause is that the amount of calculated persistent scatterers is enormous. In principle, it is not impossible to associate each point with a geographical place by checking geographical information or the like. However, since the amount is enormous, this operation takes a long time.

Technique of this Example Embodiment

Figure 3A:
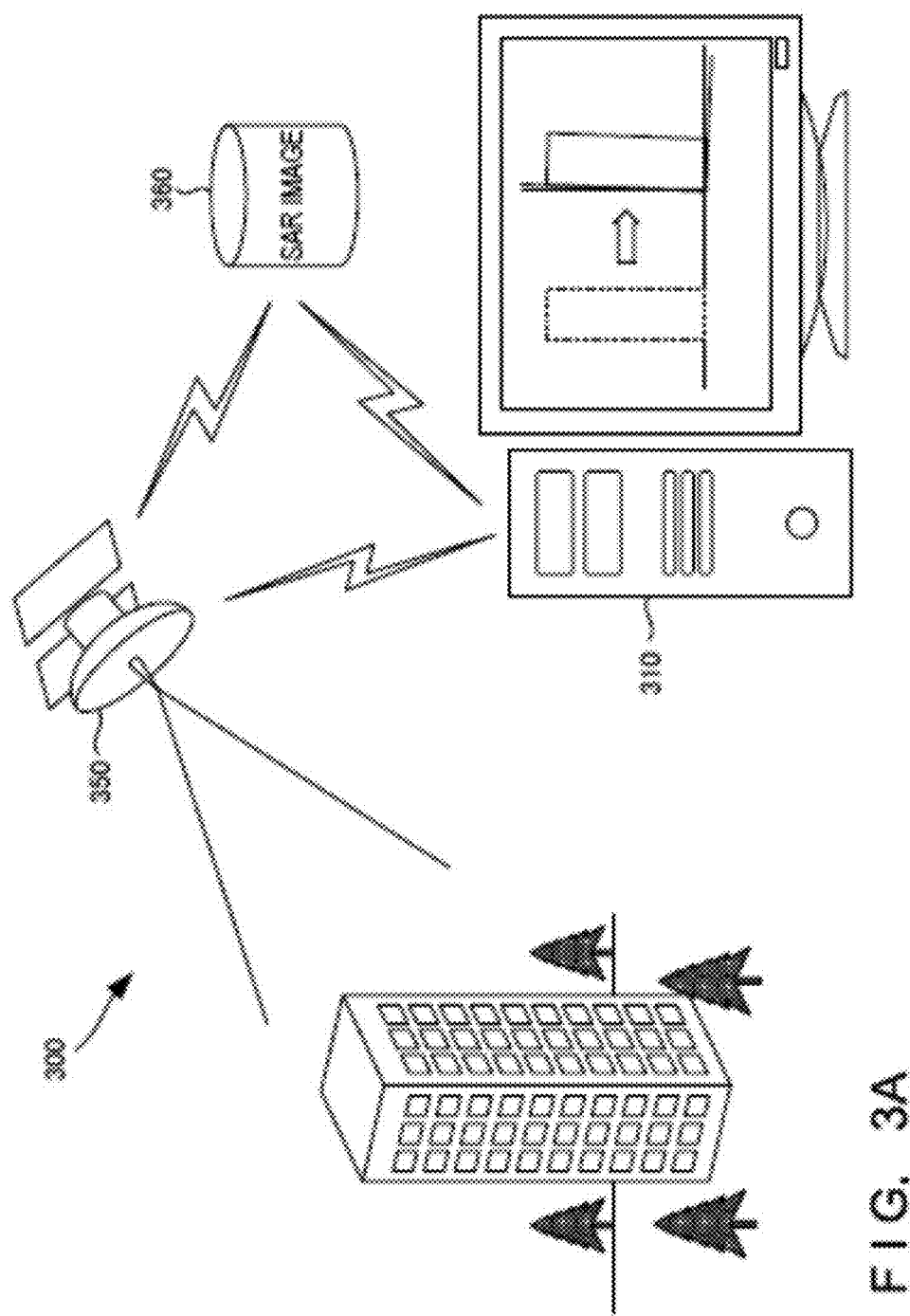
FIG. 3A is a view for explaining an overview of an image processing system according to the second example embodiment of the present invention.

FIG. 3A is a view for explaining an overview of an image processing system according to this example embodiment. An image processing system 300 includes an image processing apparatus 310 and a SAR satellite 350. The image processing system 300 determines subsidence of a building caused by the inclination of a structure on the ground such as a high rise building or apartment or ground subsidence by processing SAR images.

The SAR satellite 350 captures SAR images. The SAR satellite 350 captures SAR images of the earth's surface or a structure on the ground such as a high rise building or apartment. The SAR images captured by the SAR satellite 350 are saved in, for example, a storage 360. In addition, the SAR satellite 350 may transmit the captured SAR images to the image processing apparatus 310.

The image processing apparatus 310 acquires the plurality of SAR images captured by the SAR satellite 350. The plurality of SAR images acquired by the image processing apparatus 310 are, for example, SAR images obtained by capturing the same point, same region, same range, or the like of the earth's surface under different image capturing conditions (dates/times, weathers, SAR satellites used for image capturing, and the like). The image processing apparatus 310 may acquire the SAR images saved in the storage 360. The image processing apparatus 310 may directly acquire SAR images from the SAR satellite 350. The image processing apparatus 310 specifies persistent scatterers from the acquired SAR images. The image processing apparatus 310 further specifies a phase at each of the specified persistent scatterers.

Figure 3B:
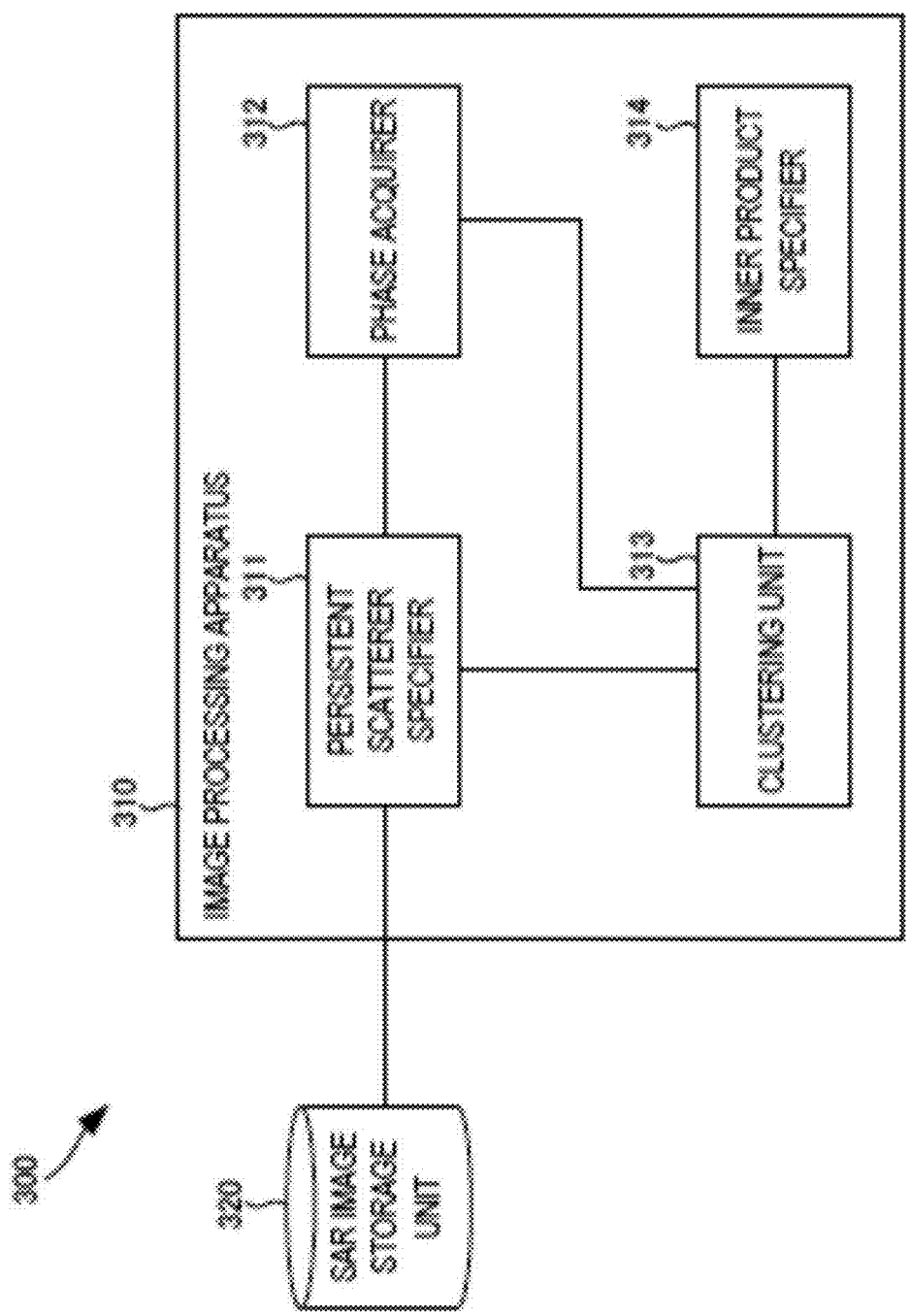
FIG. 3B is a block diagram showing the arrangement of an image processing apparatus included in the image processing system according to the second example embodiment of the present invention.
Figure 3C:
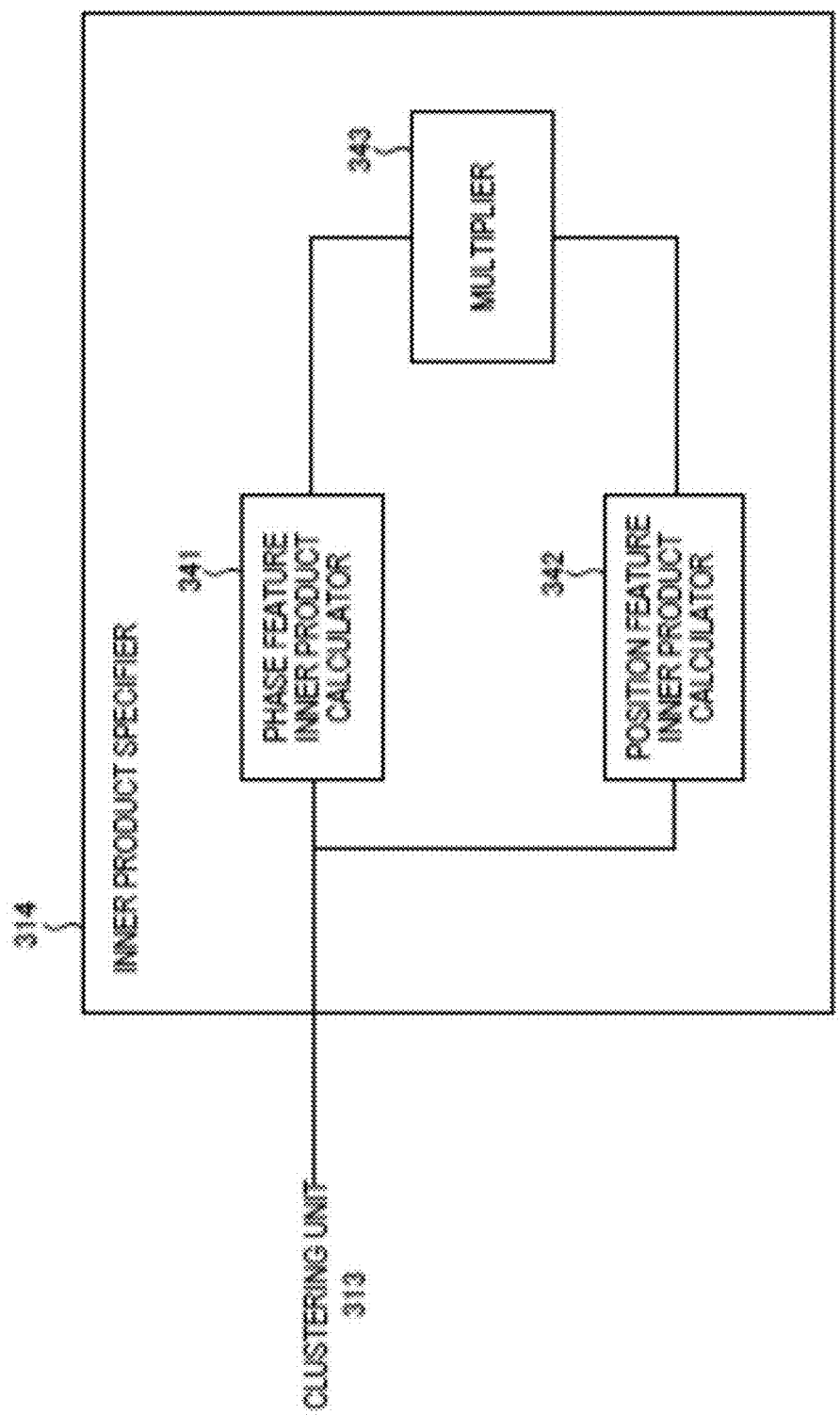
FIG. 3C is a block diagram showing the arrangement of an inner product specifier of the image processing apparatus included in the image processing system according to the second example embodiment of the present invention.
Figure 3D:
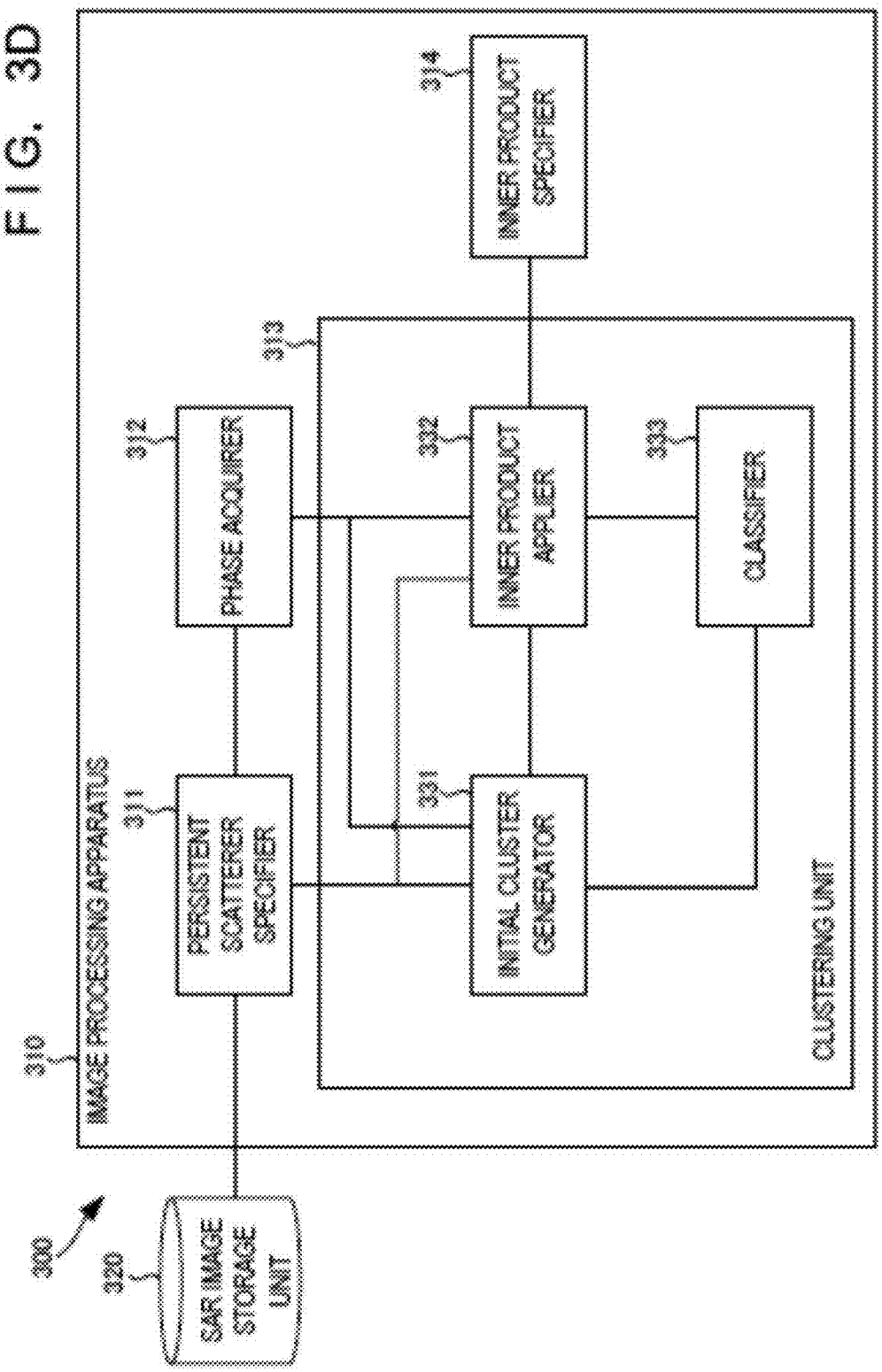
FIG. 3D is a block diagram showing the arrangement of a clustering unit of the image processing apparatus included in the image processing system according to the second example embodiment of the present invention.

FIG. 3B is a block diagram showing the arrangement of the image processing apparatus included in the image processing system according to this example embodiment. FIG. 3C is a block diagram showing the arrangement of an inner product specifier of the image processing apparatus included in the image processing system according to this example embodiment. FIG. 3D is a block diagram showing the arrangement of a clustering unit of the image processing apparatus included in the image processing system according to this example embodiment.

The image processing system 300 includes the image processing apparatus 310 and a SAR image storage unit 320. The image processing apparatus 310 includes a persistent scatterer specifier 311, a phase acquirer 312, a clustering unit 313, and an inner product specifier 314. The image processing apparatus 310 acquires a plurality of SAR images from the SAR image storage unit 320.

The persistent scatterer specifier 311 acquires a plurality of SAR images from the SAR image storage unit 320, and specifies persistent scatterers at which reflection is stable in the plurality of acquired SAR images. Each persistent scatterer indicates a pixel at which reflection is stable in the plurality of SAR images obtained by capturing the same place. To specify persistent scatterers, for example, an analysis method such as PS-InSAR (Permanent Scatters Interferometry Synthetic Aperture Radar) described in patent literature 1 is used.

The phase acquirer 312 specifies (acquires) phases at the respective persistent scatterers based on the plurality of SAR images. The phase acquirer 312 specifies the time series of phases at the respective persistent scatterers by receiving the SAR images and the positions, on the images, of the persistent scatterers calculated by the persistent scatterer specifier 311.

As phase specification, for example, for each persistent scatterer, the phase acquirer 312 may generate an array having, as elements, phases at corresponding pixels of the plurality of SAR images. Alternatively, a phase change between a reference SAR image and another SAR image may be used. In this case, a SAR image is predetermined as a reference among the plurality of SAR images obtained by capturing the same region.

Then, the phase acquirer 312 obtains a phase difference between the reference SAR image and each of the other SAR images, and sets it as an element of an array. For example, phases obtained by removing phase changes depending on an elevation may be generated as an array using DEM (Digital Elevation Model).

Phase changes depending on atmospheric fluctuation may be removed by, for example, using a known method. These phase changes are removed appropriately in accordance with an observation target or the like.

In the phase acquirer 312, for example, a complex number form normalized so that an absolute value is 1 is used as a form storing a phase. That is, a complex number having, as a polar angle, the phase calculated by the above method can be set. By using this form, clustering can be performed without considering the influence of wrapping of the phase.

The clustering unit 313 clusters the respective persistent scatterers based on the positional relationships between the persistent scatterers and the phase correlations between the persistent scatterers. That is, the clustering unit 313 clusters the respective persistent scatterers by receiving the positions of pixels serving as the persistent scatterers specified by the persistent scatterer specifier 311 and the arrays of the phases specified by the phase acquirer 312.

The inner product specifier 314 specifies (calculates) an inner product to be used for evaluation of the positional relationships between the persistent scatterers and the phase correlations between the persistent scatterers in the clustering unit 313.

FIG. 3C is a block diagram showing the arrangement of the inner product specifier of the image processing apparatus included in the image processing system according to this example embodiment. The inner product specifier 314 includes a phase feature inner product calculator 341, a position feature inner product calculator 342, and a multiplier 343.

The phase feature inner product calculator 341 calculates the inner product of features concerning the phase arrays. The position feature inner product calculator 342 calculates the inner product of features concerning the positions of the persistent scatterers. The calculated functions (inner products) are called from the clustering unit 313 appropriately. The inner product specifier 314 outputs, based on the positions of the persistent scatterers and the phase arrays, calculation results as inner products based on the positions and the phase arrays.

The inner product calculated by the inner product specifier 314 defines a distance between features at two points when persistent scatterers A and B exist. That is, the square root of an amount calculated by (inner product of persistent scatterers A)−2×(inner product of persistent scatterers A and B)+(inner product of persistent scatterers B) can be set as a Euclidean distance between features at the two points.

According to this example embodiment, the inner product defined by the inner product function will be referred to as the inner product of persistent scatterer features hereinafter, and the distance defined by the inner product function will be referred to as a distance between persistent scatterer features hereinafter. It is determined that as the inner product between two points is larger, and the inner product between each of the points and itself is smaller, the degree of relationship between the two persistent scatters is low.

The phase feature inner product calculator 341 evaluates correlations between the phases of the persistent scatterers. The position feature inner product calculator 342 evaluates the positional relationships between the persistent scatterers.

The inner product function of each of the phase feature inner product calculator 341 and the position feature inner product calculator 342 is defined as a two-variable function obtained by integrating conversion into a feature and calculation of an inner product. It is generally known that as long as two properties of "symmetry" and "positive definiteness" are satisfied, even if any function is selected as a two-variable function used as the inner product of the features, corresponding features exist.

According to this example embodiment, the phase feature inner product calculator 341 specifies an inner product function so that the distance between the persistent scatterer features is shorter as the phases are synchronized with each other. The position feature inner product calculator 342 specifies an inner product function so that the distance between the persistent scatterer features is shorter as the positions of the persistent scatterers are closer to each other.

The phase feature inner product calculator 341 receives the phase arrays at the two persistent scatterers, and specifies, for example, the square of the correlation as the inner product of the phase features. The correlation is obtained by calculating the inner product with respect to the two phase arrays given by complex numbers, and normalizing the absolute value of the inner product by a norm. That is, a phase array at a persistent scatterer m is stored in a column vector, given by:

$$s_m \tag{1}$$

A phase array at a persistent scatterer n is stored in a column vector, given by:

$$s_n \tag{2}$$

Then, the inner product of the phase features is given by:

$$\left(\frac{|s_m^* s_n|}{|s_m||s_n|}\right)^2 \tag{3}$$

The inner product of the phase features becomes larger when the persistent scatterers m and n have similar phase changes. If the phase changes are completely the same, the inner product becomes 1. As a result, if the outputs of the phase feature inner product calculator 341 are the same, the distance between the persistent scatterer features is shorter as the persistent scatterers m and n have more similar phase changes.

As the inner product of the phase features, the deformed correlation may be used. For example, a constant may be added to $$\left(\frac{|s_m^* s_n|}{|s_m||s_n|}\right)^2 \tag{4}$$

Alternatively, an operation of applying a polynomial equation having a positive coefficient may be performed.

A monotonically increasing exponential function may be applied to a value obtained by subtracting 1 from the above inner product, or the square root of a value obtained by subtracting the above inner product from 1 may be calculated and applied with monotonically increasing exponential function. In either of the examples, since the distance between the persistent scatterer features is shorter as the phase changes are more similar, the above obtained result can be used as the inner product function in the phase feature inner product calculator 341 according to this example embodiment.

The position feature inner product calculator 342 receives the positions of two persistent scatterers, and can set, for example, as an inner product, a result of applying a function which becomes smaller (monotonically decreasing) as the distance between the positions of the persistent scatterers is longer. For example, a result of applying a Gaussian function to a Euclidean distance between the positions of the persistent scatterers may be set as the inner product of the position features. That is, the position of the persistent scatterer m is given by:

$$r_m \tag{5}$$

The position of the persistent scatterer n is given by:

$$r_n \tag{6}$$

At this time, a Gaussian function with a parameter σ given by $$\exp\left(-\frac{|r_m - r_n|^2}{\sigma^2}\right) \tag{7}$$

may be set as the inner product of the position features.

Furthermore, using an inverse matrix $\Sigma^{-1}$ of a positive definite matrix $\Sigma$, $$\exp(-(r_m - r_n)^T \Sigma^{-1} (r_m - r_n)) \tag{8}$$

may be set as the inner product of the position features.

An exponential function may be applied without squaring the Euclidean distance between the positions of the persistent scatterers, and $$\exp\left(-\frac{|r_m - r_n|}{\sigma}\right) \quad (9)$$

may be set as the inner product of the position features.

All the above-described examples of the inner product of the position features are functions that become closer to 0 as the Euclidean distance between the positions of the persistent scatterers is longer and become 1 for completely the same positions. If the distance between the persistent scatterer features is obtained using such inner product, the distance between the persistent scatterer features is shorter as the positions are closer to each other.

Even if a function does not become smaller as the distance between the positions of the persistent scatterers is longer, the function may be usable as the inner product of the position features. For example, the inner product of position vectors at the persistent scatterers, given by $$r_m \cdot r_n \quad (10)$$

may be set as the inner product of the position features. In this case as well, since the distance between the persistent scatterer features is shorter as the persistent scatterers are closer to each other on the images, the function can be used in the position feature inner product calculator 342.

FIG. 3D is a block diagram showing the arrangement of the clustering unit of the image processing apparatus included in the image processing system according to this example embodiment. The clustering unit 313 includes an initial cluster generator 331, an inner product applier 332, and a classifier 333.

The inner product applier 332 receives the positions of the respective persistent scatterers and phase arrays at the respective persistent scatterers, and applies the inner production function to a combination of the persistent scatterers. At this time, an inner product may be calculated for all combinations, or calculation need not be performed for a portion where it is apparent based on another knowledge that an inner product is 0.

For example, when a result of applying a Gaussian function to the Euclidean distance between the positions of the persistent scatterers on the images is used as the inner product of the position features, the inner product of points away from each other to some extent is almost 0. Thus, calculation need not be performed and all the inner products of the points away from each other may be set to 0.

The initial cluster generator 331 assigns an initial cluster to each persistent scatterer. As for distribution of initial clusters, for example, initial clusters the number of which is designated in advance by a user or the like are generated. If the number of initial clusters to be generated is not designated, the initial cluster generator 331 may generate initial clusters by appropriately deciding the number of initial clusters to be generated.

As a method of assigning the initial clusters, the initial clusters may completely randomly be decided. Alternatively, based on the positions of the persistent scatterers, decision may be made so that the positions of the centers of the clusters are arranged at equal intervals. The inner product applier 332 may select, based on the calculated inner products, some of the persistent scatterers whose distances defined by the inner products are as long as possible, set the selected persistent scatterers as representative points of the clusters, and distribute each persistent scatterer to the cluster having the closest representative point.

For example, the classifier 333 classifies the persistent scatterers as follows. The classifier 333 divides a cluster so that the sum of squares of the distances between the persistent scatterer feature at the centroid of each cluster and those at the respective persistent scatterers belonging to the cluster becomes smallest. The centroid indicates a feature such that the sum of squares of the distances between the persistent scatterer features defined by the inner product specifier 314 with respect to the persistent scatterers forming the cluster is smallest. To implement such classification, a method called Kernel K-means is used.

In Kernel K-means, by integrating calculation of the centroid and calculation of the squares of the distances between the features at the centroid and the respective points, only an inner function is used without calculation of the features to perform calculation as follows.

$$d^2(p_m, C) = K(p_m, p_m) - 2 \frac{\Sigma_{i \in C} K(p_m, p_i)}{\Sigma_{i \in C} 1} + \frac{\Sigma_{i \in C} \Sigma_{j \in C} K(p_i, p_j)}{\Sigma_{i \in C} \Sigma_{j \in C} 1} \quad (11)$$

where p represents a data point as a target of evaluation of a distance, a subscript m represents the index of evaluation target data, C represents a cluster, and a two-variable function K represents an inner function concerning the features of the data points. In this example embodiment, a persistent scatterer is used as the data point p, and the proposed inner product function defined by the inner product specifier 314 is used as the inner product function K.

To extract the centroid, weighting may be performed based on a distance to a specific point, which is focused on. In this case, the square of the distance is calculated by:

$$d^2(p_m, C) = K(p_m, p_m) - 2 \frac{\Sigma_{i \in C} w(p_i) K(p_m, p_i)}{\Sigma_{i \in C} w(p_i)} + \frac{\Sigma_{i \in C} \Sigma_{j \in C} w(p_i) w(p_j) K(p_i, p_j)}{\Sigma_{i \in C} \Sigma_{j \in C} w(p_i) w(p_j)} \quad (12)$$

where w(p) represents a weight for the point p.

In a clustering method according to this example embodiment using Kernel K-means, the persistent scatterers are classified as follows. First, the inner product applier 332 receives the cluster information generated in the initial cluster generator 331 and the inner product of the persistent scatterer features calculated in the inner product specifier 314, and calculates the square of the distance between the persistent scatterer features at the centroid of each cluster and each persistent scatterer.

Then, the classifier 333 reassigns each persistent scatterer to the cluster corresponding to the centroid for which the square of the distance between the persistent scatterer features is smallest. This classification updates the persistent scatterers belonging to each cluster.

The classifier 333 may repeatedly perform the above-described operation. That is, the classifier 333 performs reclassification again for each cluster in which belonging persistent scatterers have been updated by reclassification. By repeating this operation, each of all the persistent scatterers is classified into the cluster such that the sum of squares of the distances between the persistent scatterer features and the centroid is smallest.

The multiplier 343 integrates evaluations concerning the positional relationships and the phase correlations between the persistent scatterers.

Figure 4A:
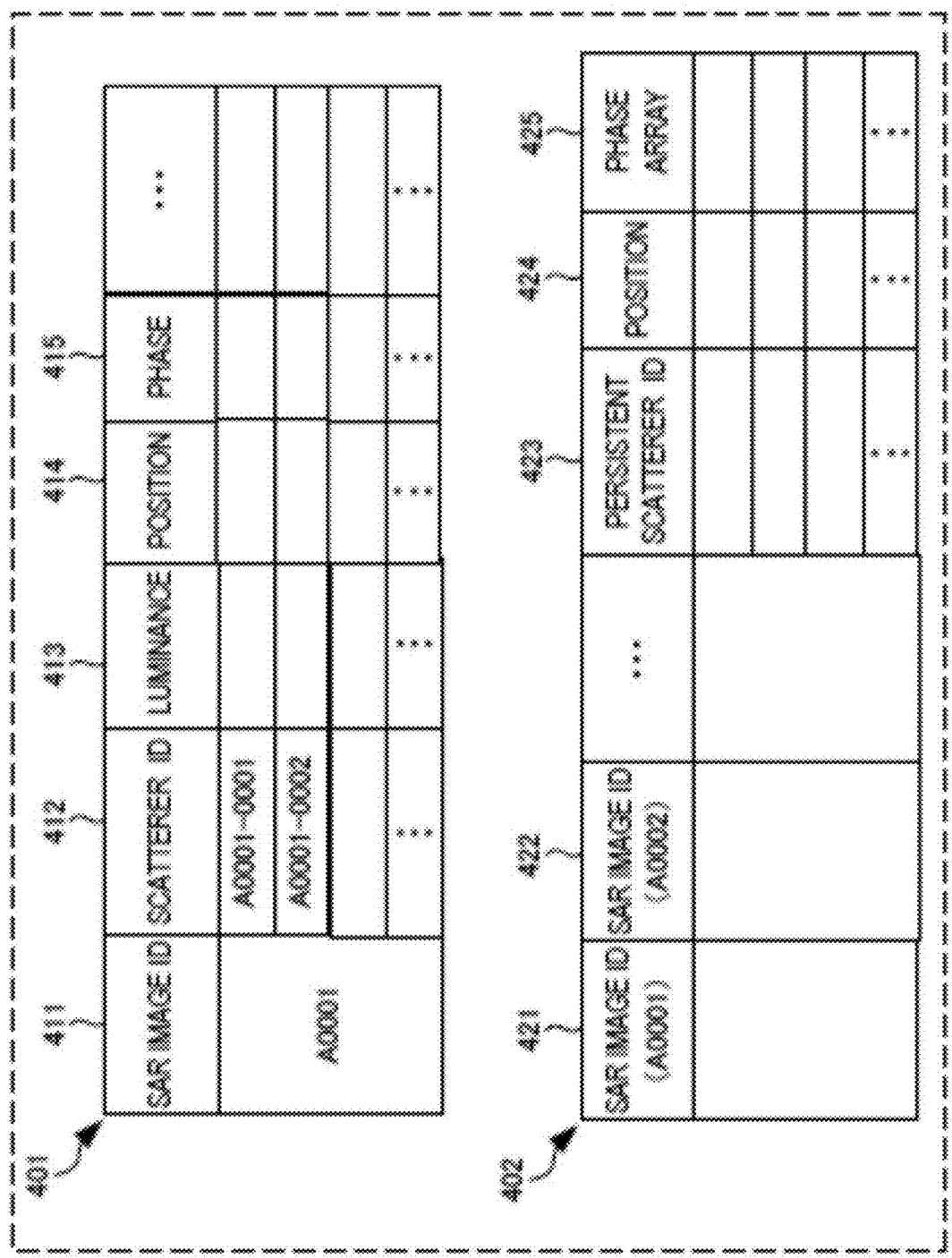
FIG. 4A is a view showing examples of a SAR image table and a persistent scatterer table, both of which are held by the image processing apparatus included in the image processing system according to the second example embodiment of the present invention.

FIG. 4A is a view showing examples of a SAR image table and a persistent scatterer table, both of which are held by the image processing apparatus included in the image processing system according to this example embodiment. A SAR image table 401 stores a scatterer point ID 412, a luminance 413, a position 414, and a phase 415 in association with a SAR image ID (Identifier) 411. The SAR image ID 411 is an identifier for identifying a SAR image. The scatterer point ID 412 is an identifier for identifying a scatterer point included in the SAR image. The luminance 413 indicates the luminance of the scatterer point. The position 414 indicates the position of the scatterer point. The phase 415 indicates the phase of the scatterer point. A persistent scatterer table 402 stores a persistent scatterer ID 423, a position 424, and a phase array 425 in association with a SAR image ID (A0001) 421 and a SAR image ID (A0002) 422. The persistent scatterer ID 423 is an identifier for identifying a persistent scatterer specified from a plurality of SAR images. The position 424 and the phase array 425 indicate a position and phase array at each persistent scatterer, respectively.

Figure 4B:
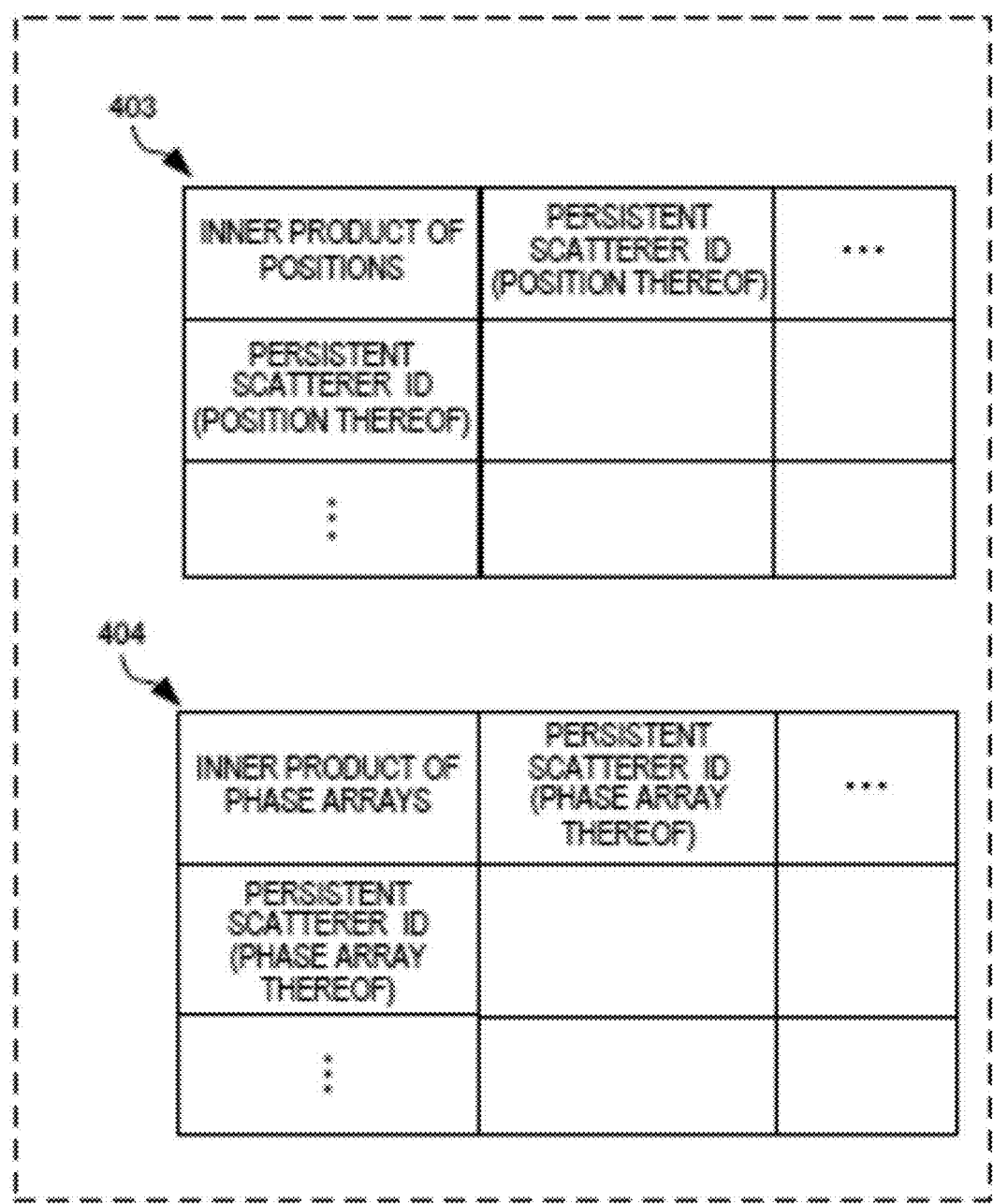
FIG. 4B is a view showing examples of a position inner product table and a phase array inner product table, both of which are held by the image processing apparatus included in the image processing system according to the second example embodiment of the present invention.

FIG. 4B is a view showing examples of a position inner product table and a phase array inner product table, both of which are held by the image processing apparatus included in the image processing system according to this example embodiment. A position inner product table 403 stores an inner product concerning the positions of persistent scatterers. A phase array inner product table 404 stores an inner product concerning the phase arrays of persistent scatterers. Calculation of an inner product is performed with respect to, for example, a distance between the features of the positions (or phase arrays) of the persistent scatterers in the SAR images.

Figure 4C:
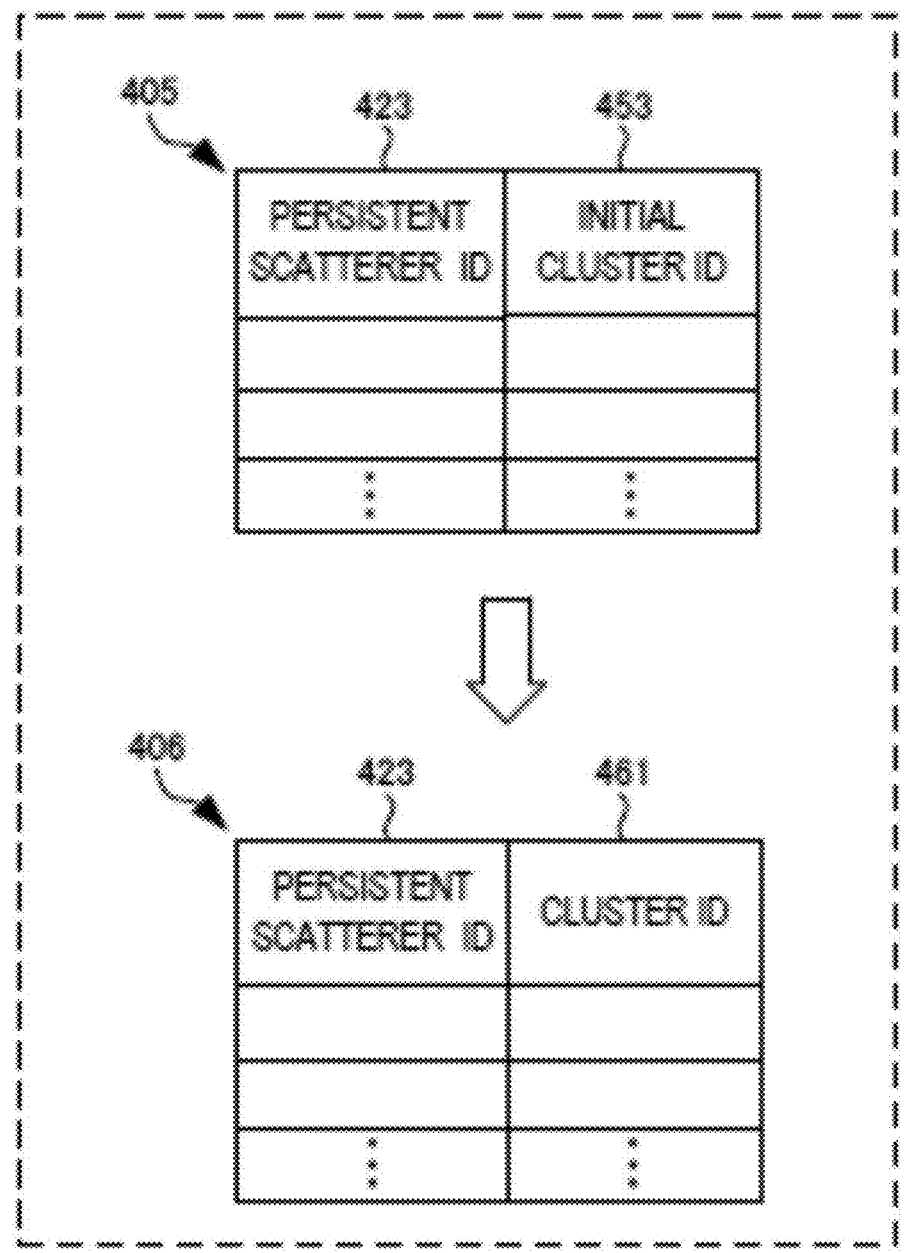
FIG. 4C is a view showing examples of an initial cluster table and a cluster table, both of which are held by the image processing apparatus included in the image processing system according to the second example embodiment of the present invention.

FIG. 4C is a view showing examples of an initial cluster table and a cluster table, both of which are held by the image processing apparatus included in the image processing system according to this example embodiment. An initial cluster table 405 stores an initial cluster ID 453 in association with the persistent scatterer ID 423. An initial cluster is decided using the inner product of the positions and that of the phase arrays. A cluster table 406 stores a cluster ID 461 in association with the persistent scatterer ID 423. The cluster ID 461 is an identifier for identifying a cluster into which each persistent scatterer is classified. The image processing apparatus 310 repeats clustering of each persistent scatterer assigned to the initial cluster. The image processing apparatus 310 repeats clustering, thereby updating the cluster to which each persistent scatterer is assigned. This decides a final cluster. Then, the image processing apparatus 310 clusters each persistent scatterer with reference to the tables 401 to 406.

Figure 5:
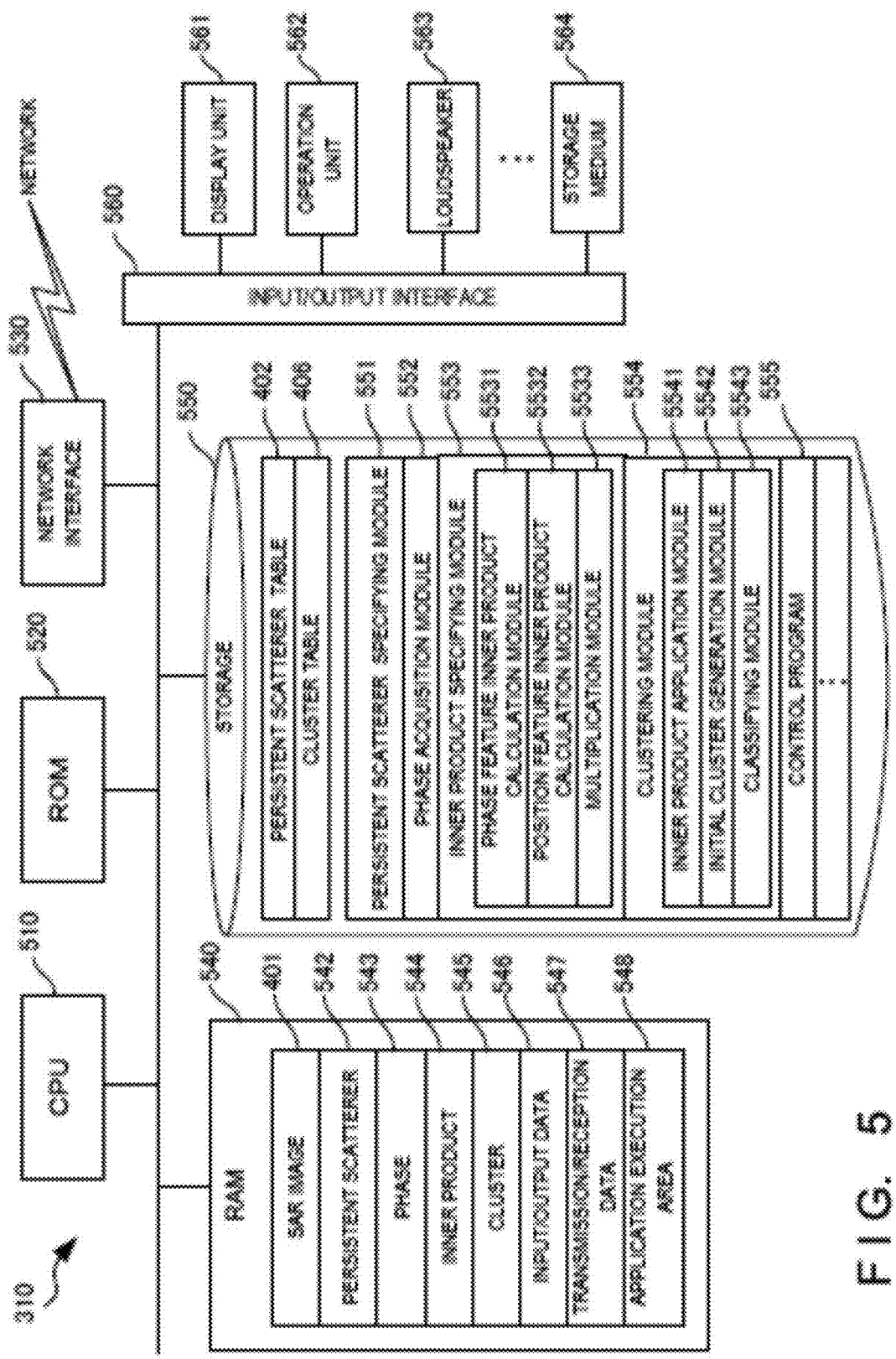
FIG. 5 is a block diagram showing the hardware arrangement of the image processing apparatus included in the image processing system according to the second example embodiment of the present invention.

FIG. 5 is a block diagram showing the hardware arrangement of the image processing apparatus included in the image processing system according to this example embodiment. A CPU (Central Processing Unit) 510 is an arithmetic control processor, and implements the functional components of the image processing apparatus 310 shown in FIGS. 3A to 3D by executing a program. A ROM (Read Only Memory) 520 stores permanent data such as initial data and a program, and other programs. A network interface 530 communicates with another apparatus and the like via a network. Note that the number of CPUs 510 is not limited to one, and a plurality of CPUs or a GPU (Graphics Processing Unit) for image processing may be included. The network interface 530 desirably includes a CPU independent of the CPU 510, and writes or reads out transmission/reception data in or from the area of a RAM (Random Access Memory) 540. It is desirable to provide a DMAC (Direct Memory Access Controller) (not shown) for transferring data between the RAM 540 and a storage 550. Furthermore, an input/output interface 560 desirably includes a CPU independent of the CPU 510, and writes or reads out input/output data in or from the area of the RAM 540. Therefore, the CPU 510 processes the data by recognizing that the data has been received by or transferred to the RAM 540. The CPU 510 prepares a processing result in the RAM 540, and delegates succeeding transmission or transfer to the network interface 530, the DMAC, or the input/output interface 560.

The RAM 540 is a random access memory used as a temporary storage work area by the CPU 510. An area to store data necessary for implementation of this example embodiment is allocated to the RAM 540. The SAR image 401 is a SAR image acquired from the SAR image storage unit 320. A persistent scatterer 542 is a persistent scatterer specified from SAR images. A phase 543 is a phase (phase array) at each persistent scatterer. An inner product 544 is an inner product concerning persistent scatterers. A cluster 545 is a cluster into which each persistent scatterer is clustered.

Input/output data 546 is data input/output via the input/output interface 560. Transmission/reception data 547 is data transmitted/received via the network interface 530. The RAM 540 includes an application execution area 548 used to execute various application modules.

The storage 550 stores a database, various parameters, or the following data or programs necessary for implementation of this example embodiment. The storage 550 stores the persistent scatterer table 402. The persistent scatterer table 402 is the table, shown in FIG. 4A, for managing the relationship between the SAR image ID 421 and the persistent scatterer ID 423 and the like. The cluster table 406 is the table, shown in FIG. 4C, for managing the relationship between the persistent scatterer ID 423 and the cluster ID 461. The storage 550 further stores a persistent scatterer specifying module 551, a phase acquisition module 552, an inner product specifying module 553, and a clustering module 554.

The persistent scatterer specifying module 551 is a module that specifies persistent scatterers on SAR images. The phase acquisition module 552 is a module that specifies the phase of each persistent scatterer. The inner product specifying module 553 is a module that specifies an inner product. The clustering module 554 is a module that clusters the persistent scatterers.

The storage 550 further stores a phase feature inner product calculation module 5531, a position feature inner product specifying module 5532, and a multiplication module 5533. The phase feature inner product calculation module 5531 is a module that specifies the inner product of phase features. The position feature inner product specifying module 5532 is a module that specifies the inner product of position features. The multiplication module 5533 is a module that integrates evaluations concerning the positional relationships and the phase correlations between the persistent scatterers.

An inner product application module 5541 is a module that applies the inner function to a combination of persistent scatterers. An initial cluster generation module 5542 is a module that assigns an initial cluster to each persistent scatterer. A classifying module 5543 is a module that classifies each persistent scatterer.

These modules 551 to 554, 5531 to 5533, and 5541 to 5543 are read out into the application execution area 548 of the RAM 540 and executed by the CPU 510. A control program 555 is a program for controlling the overall image processing apparatus 310.

The input/output interface 560 interfaces input/output data with an input/output device. The input/output interface 560 is connected to a display unit 561 and an operation unit 562. The input/output interface 560 may also be connected to a storage medium 564. Furthermore, a loudspeaker 563 serving as a voice output unit, a microphone serving as a voice input unit, or a GPS (Global Positioning System) position determiner may be connected. Note that programs and data that are associated with the general-purpose functions of the image processing apparatus 310 and other feasible functions are not shown in the RAM 540 or the storage 550 of FIG. 5.

Figure 6A:
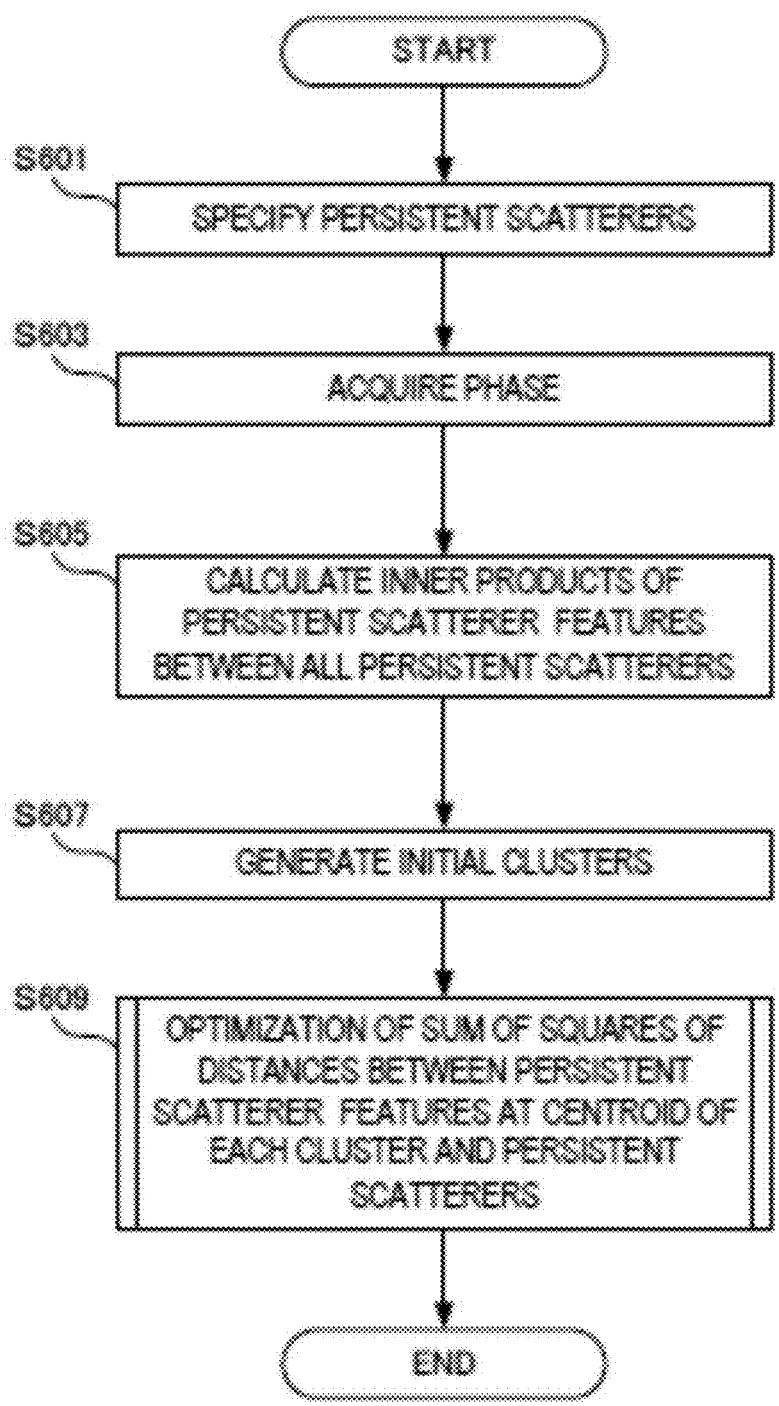
FIG. 6A is a flowchart for explaining the processing procedure of the image processing apparatus included in the image processing system according to the second example embodiment of the present invention.
Figure 6B:
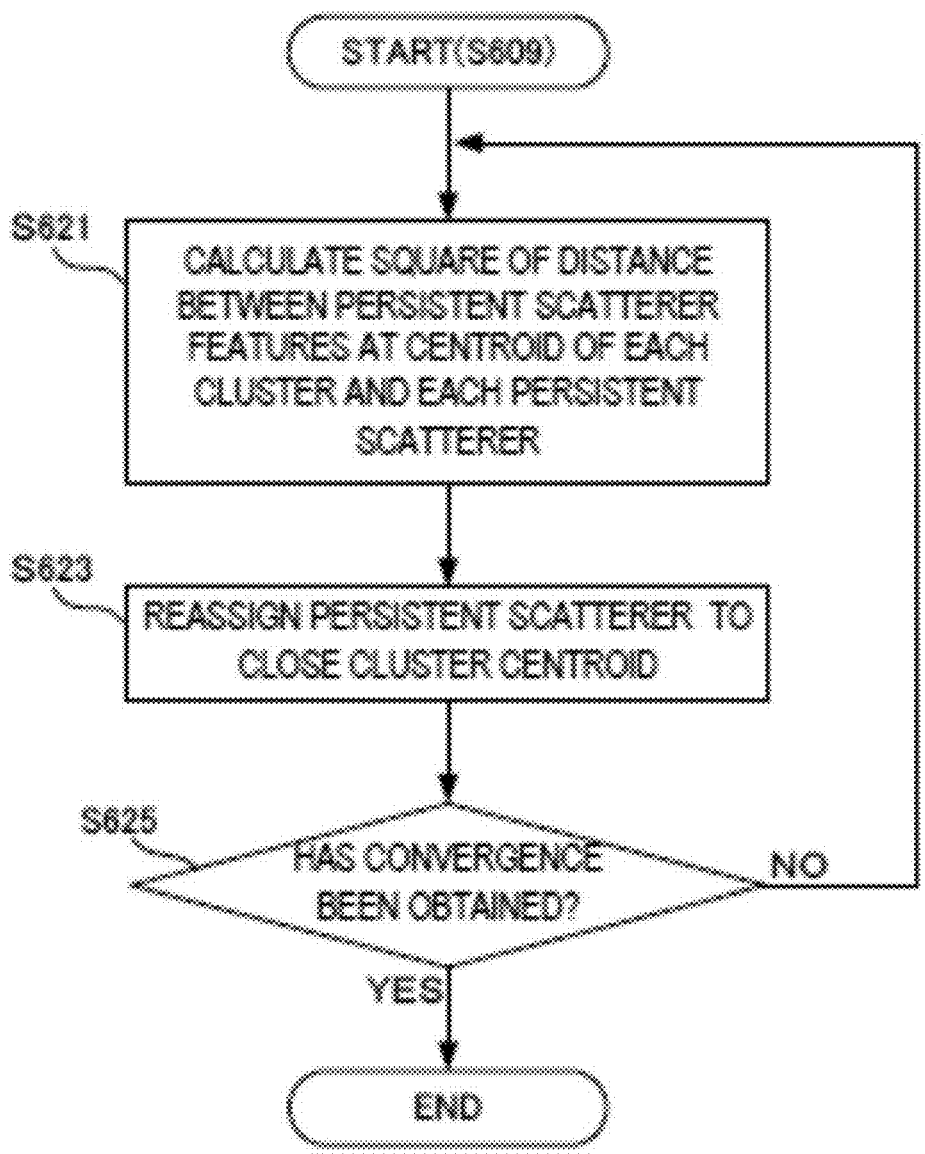
FIG. 6B is a flowchart for explaining the processing procedure of cluster calculation by the image processing apparatus included in the image processing system according to the second example embodiment of the present invention.

FIG. 6A is a flowchart for explaining the processing procedure of the image processing apparatus included in the image processing system according to this example embodiment. FIG. 6B is a flowchart for explaining the processing procedure of cluster calculation by the image processing apparatus included in the image processing system according to this example embodiment. These flowcharts are executed by the CPU 510 using the RAM 540, thereby implementing the functional components of the image processing apparatus 310 shown in FIGS. 3A to 3D.

In step S601, the persistent scatterer specifier 311 of the image processing apparatus 310 receives SAR images to specify persistent scatterers. In step S603, the phase acquirer 312 of the image processing apparatus 310 acquires a phase at each of the persistent scatterers. The phase acquirer 312 acquires a phase by, for example, calculating a phase array.

In step S605, the image processing apparatus 310 calculates the inner products of persistent scatterer features between all the persistent scatterers. The inner product applier 332 of the clustering unit 313 calculates the inner products of the persistent scatterer features between all the persistent scatterers based on the inner product function using the inner product specifier 314.

In step S607, the initial cluster generator 331 of the clustering unit 313 decides assignment of initial clusters based on the positions of the persistent scatterers, the inner products of the persistent scatterer features, and the like. Note that if the inner products of the persistent scatterer features are not used for generation of initial clusters, steps S605 and S607 may be inversed or executed at the same time.

In step S609, based on the initial clusters generated by the initial cluster generator 331 and the inner products of the persistent scatterer features between all the persistent scatterers calculated by the inner product applier 332, the classifier 333 of the clustering unit 313 classifies each cluster so that the sum of squares of the distances between the persistent scatterer features at the centroid of the cluster and the persistent scatterers forming the cluster is smallest.

In step S609, when classification is performed based on the Kernel K-means method, the classifier 333 operates in accordance with the flowchart shown in FIG. 6B.

In step S621, the classifier 333 of the image processing apparatus 310 calculates the square of the distance between the persistent scatterer features at the centroid of each cluster generated by the initial cluster generator 331 and each persistent scatterer. This calculation is performed based in the inner products of the persistent scatterer features concerning all the persistent scatterers calculated by the inner product applier 332.

In step S623, the image processing apparatus 310 searches for a centroid for which the square of the distance between the persistent scatterer features calculated in step S621 is smallest, and performs reassignment to a cluster corresponding to the centroid.

In step S625, the image processing apparatus 310 determines whether convergence has been obtained. If it is determined that convergence has been obtained (YES in step S625), the image processing apparatus 310 ends the processing; otherwise (NO in step S625), the image processing apparatus 310 returns to step S621.

When convergence is obtained, for example assignment of the cluster remains unchanged. Furthermore, even if assignment changes to some extent, if the number of points for which assignment changes is small, it may be determined that convergence has been obtained. Instead of determining whether assignment changes, the number of times reassignment is performed to obtain convergence may be predicted based on known knowledge, and it may be determined that convergence has been obtained after repeating reassignment the predetermined number of times. The above operations calculate the cluster of each persistent scatterer.

According to this example embodiment, it is easy to associate points in SAR images with a structure. Since a group of points at a place where layover occurs can be displayed as another cluster, it is possible to prevent persistent scatterers at a geographically separated place from being associated with the same structure. Furthermore, since persistent scatterers are collected for each structure, it is not necessary to associate an enormous amount of persistent scatterers, and it is only necessary to verify association of a small number of clusters and a structure.

Third Example Embodiment

Figure 7:
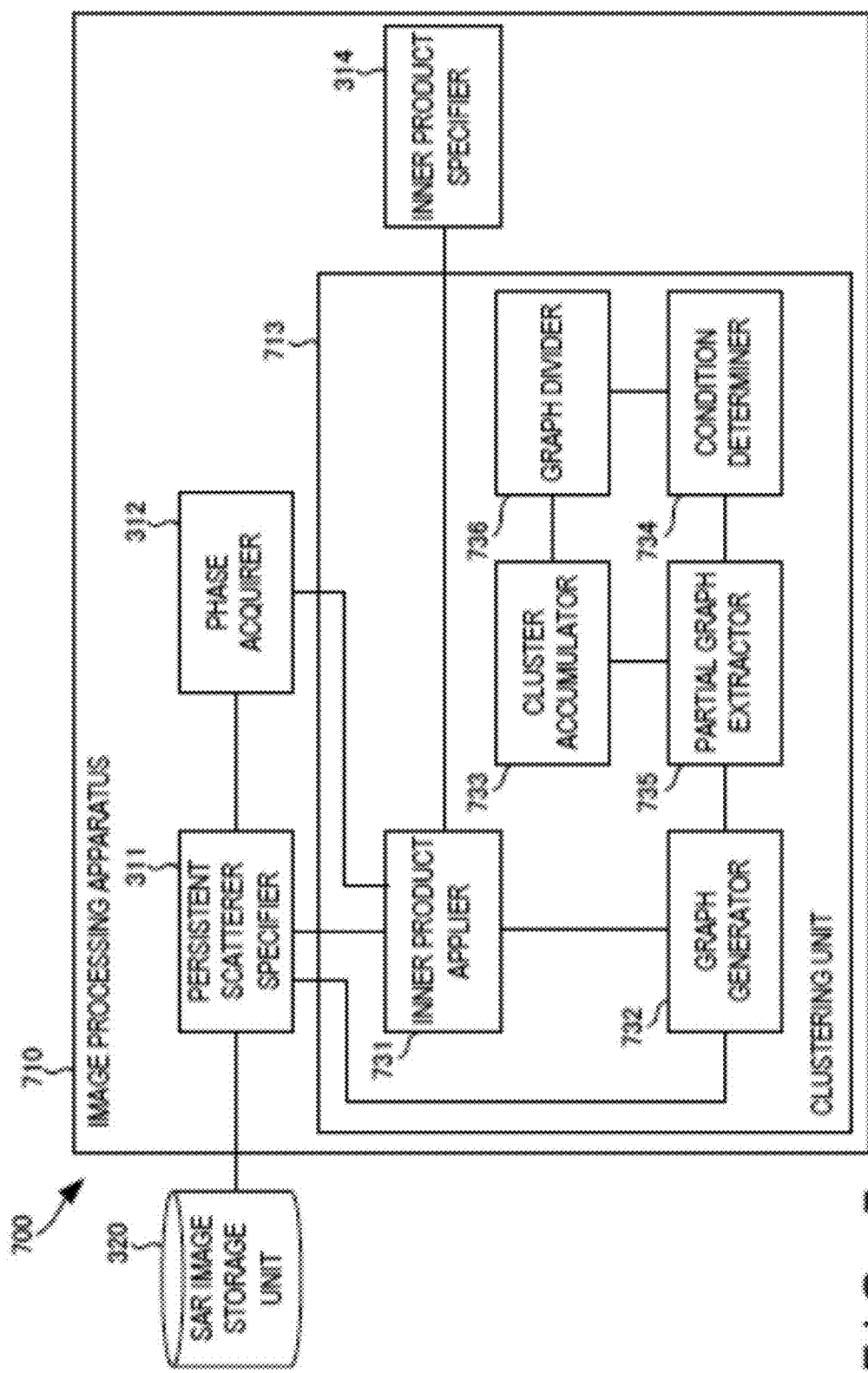
FIG. 7 is a block diagram showing the arrangement of an image processing system according to the third example embodiment of the present invention.

An image processing system according to the third example embodiment of the present invention will be described next with reference to FIGS. 7 to 10B. FIG. 7 is a block diagram for explaining the arrangement of an image processing system according to this example embodiment. The image processing system according to this example embodiment is different from that according to the above-described second example embodiment in that an image processing apparatus included in the image processing system includes a clustering unit 713 in place of the clustering unit 313. The remaining components and operations are similar to those in the second example embodiment. Hence, the same reference numerals denote the similar components and operations, and a detailed description thereof will be omitted.

An image processing system 700 includes an image processing apparatus 710 and a SAR image storage unit 320. The image processing apparatus 710 includes a persistent scatterer specifier 311, a phase acquirer 312, the clustering unit 713, and an inner product specifier 314. The clustering unit 713 clusters persistent scatterers based on inner products specified by the inner product specifier 314.

The clustering unit 713 includes an inner product applier 731, a graph generator 732, a cluster accumulator 733, a condition determiner 734, a partial graph extractor 735, and a graph divider 736.

The inner product applier 731 calculates the inner product of persistent scatterer features by applying, to a pair of persistent scatterers, an inner product function specified by the inner product specifier 314. If it is apparent based on another knowledge that the inner product is close to 0, the inner product need not be calculated.

The graph generator 732 generates a graph having persistent scatterers as nodes and having, as the weights of edges, the inner products of the persistent scatterer features. That is, the graph generator 732 generates a weighted undirected graph that connects the persistent scatterers. The weighted undirected graph is a graph having persistent scatterers as nodes and having, as weight information, the inner products of the persistent scatterer features calculated by the inner product applier 731 at edges each connecting the persistent scatterers.

At this time, with respect to a pair of persistent scatterers connected on a graph, all the pairs of persistent scatterers for which the inner products have been calculated by the inner product specifier 314 may be connected. Furthermore, based on the values of the inner products of the persistent scatterer features calculated by the inner product applier 731, a pair of persistent scatterers for which the inner product of the persistent scatterer features is equal to or larger than a predetermined value may be connected.

Based on pieces of phase information of persistent scatterers, a pair of persistent scatterers having phases correlated at a predetermined level or higher may be connected. Furthermore, a pair of persistent scatterers determined not to have a strong relationship based on another geographical space information, prior knowledge, and the like need not be connected. For each edge connecting persistent scatterers calculated by the above method, the inner product of the persistent scatterer features between the persistent scatterers directly connected by the edge is set as the weight of the edge.

Note that the graph generator 732 can generate a graph based on the inner products calculated by the inner product applier 731. However, to the contrary, if the graph generator 732 can define a connection in advance based on known information and the like, a pair of persistent scatterers for which an inner product is to be calculated may be decided based on the connection. In this case, the inner product of the persistent scatterers directly connected by an edge existing on the graph generated by the graph generator 732 may be calculated.

The cluster accumulator 733 holds cluster information for which division of a cluster has not ended. At the start of clustering, one cluster having all the persistent scatterers as elements may be held as an initial value before division to clusters is performed or clusters divided based on some known information may be held.

The cluster accumulator 733 has a function of sequentially accumulating clusters divided by a repetitive operation and a function of sequentially extracting the accumulated clusters one by one to divide again. Extraction indicates output of cluster information and removal of the cluster from the cluster accumulator 733. As for an accumulation order and an extraction order, a FIFO (First In First Out) method of extracting first data accumulated first or a FILO (First In Last Out) method of lastly extracting data accumulated first may be used.

Prioritization may be performed by some method to extract the clusters. For example, a cluster which has not been divided sufficiently may preferentially be extracted based on the distances between persistent scatterer features and the like with respect to the persistent scatterers and the centroid of a cluster having a largest number of elements among the accumulated clusters. Alternatively, with reference to the weights of edges respectively connecting the persistent scatterers of each cluster, a cluster having a larger average or minimum value of the weights may preferentially be extracted.

The partial graph extractor 735 extracts, from the entire graph generated by the graph generator 732, a partial graph concerning persistent scatterers belonging to the cluster to be divided. That is, the partial graph extractor 735 receives the cluster from the cluster accumulator 733, receives the entire graph of the persistent scatterers from the graph generator 732, and extracts a graph representing connections of the persistent scatterers forming the cluster.

The condition determiner 734 determines whether division of each cluster is complete. That is, the condition determiner 734 determines whether each cluster satisfies an end condition. A cluster that does not satisfy the end condition is accumulated in the cluster accumulator 733 to be divided again. A cluster that satisfies the end condition is sequentially output as a confirmed cluster, and is not accumulated in the cluster accumulator 733 not to be divided again.

As the end condition, when the number of persistent scatterers forming a cluster becomes small, division may be stopped. When the distance between the persistent scatterer features at the persistent scatterers of the cluster or between the persistent scatterer features at the centroid of the cluster and each persistent scatterer is calculated and the calculated distance is short, division may be stopped. Alternatively, when a distance between the positions of the persistent scatterers of the cluster is sufficiently short, division may be stopped.

The graph divider 736 divides the cluster by dividing the graph. The graph divider 736 divides the extracted partial graph based on the weights of edges. As a division method based on the weights of edges, for example, division is performed based on the weight of a cut.

The cut indicates a pair of sets obtained by dividing a node set forming the graph. The weight of the cut is obtained by calculating, for the two node sets forming the cut, the sum of the weights of all the edges connecting nodes belonging to one node set and nodes belonging to the other node set. That is, the weight of the cut is calculated by:

$$\text{cut}(A, B) = \sum_{i \in A} \sum_{j \in B} w_{i,j} \tag{13}$$

where $w_{i,j}$ represents the weight of edge when a connection edge from a node i to a node j exists, and has a numerical value that becomes 0 when there is no connection. Furthermore, the two divided node sets are represented by A and B.

Division is performed so that an index obtained by normalizing the weight of the cut by some method becomes smallest. For example, an index called Normalized Cut is obtained by performing normalization, for each of the two node sets forming the cut, by dividing the weight of the cut by the total of the weights of edges directly connected from the nodes forming each of the node sets, and then obtaining the sum of the thus obtained two normalized weights of the cut. That is, the index is calculated by:

$$N\text{cut}(A, B) = \frac{\text{cut}(A, B)}{\sum_{i \in A} \sum_{j \in V} w_{i,j}} + \frac{\text{cut}(A, B)}{\sum_{i \in V} \sum_{j \in B} w_{i,j}} \tag{14}$$

where $w_{i,j}$ represents the weight of an edge when a connection edge from a persistent scatterer i to a persistent scatterer j exists, and has a numerical value that becomes 0 when there is no connection. A node set before division is represented by V and two node sets are represented by A and B.

By using this index, each of the divided node sets does not become too small, and a division result such that the set is divided by an edge with weak connection can be obtained. A result of performing normalization by the total number of edges between the two node sets forming the cut may be minimized to perform division.

Furthermore, for example, another edge weight defined based on the distance between the persistent scatterers may be defined, and division may be performed so as to minimize a result of performing normalization by the weight of the cut with respect to the defined edge weight. This can adjust the density of points after clustering. The two sets of persistent scatterers obtained by division are accumulated as new clusters in the cluster accumulator 733.

After that, extraction from the cluster accumulator 733 and extraction of a partial graph, determination of the stop condition, and division are repeated until all the clusters satisfy the stop condition and are output, and no clusters remain in the cluster accumulator 733. Pieces of cluster information output before the above repetitive processing ends correspond to a final clustering result.

FIG. 8A is a table showing an example of a generated graph table held by the image processing apparatus included in the image processing system according to this example embodiment. A generated graph table 801 stores a generated graph 811 in association with a persistent scatterer ID 423 and the like. The generated graph 811 is a weighted undirected graph that connects persistent scatterers.

Figure 8B:
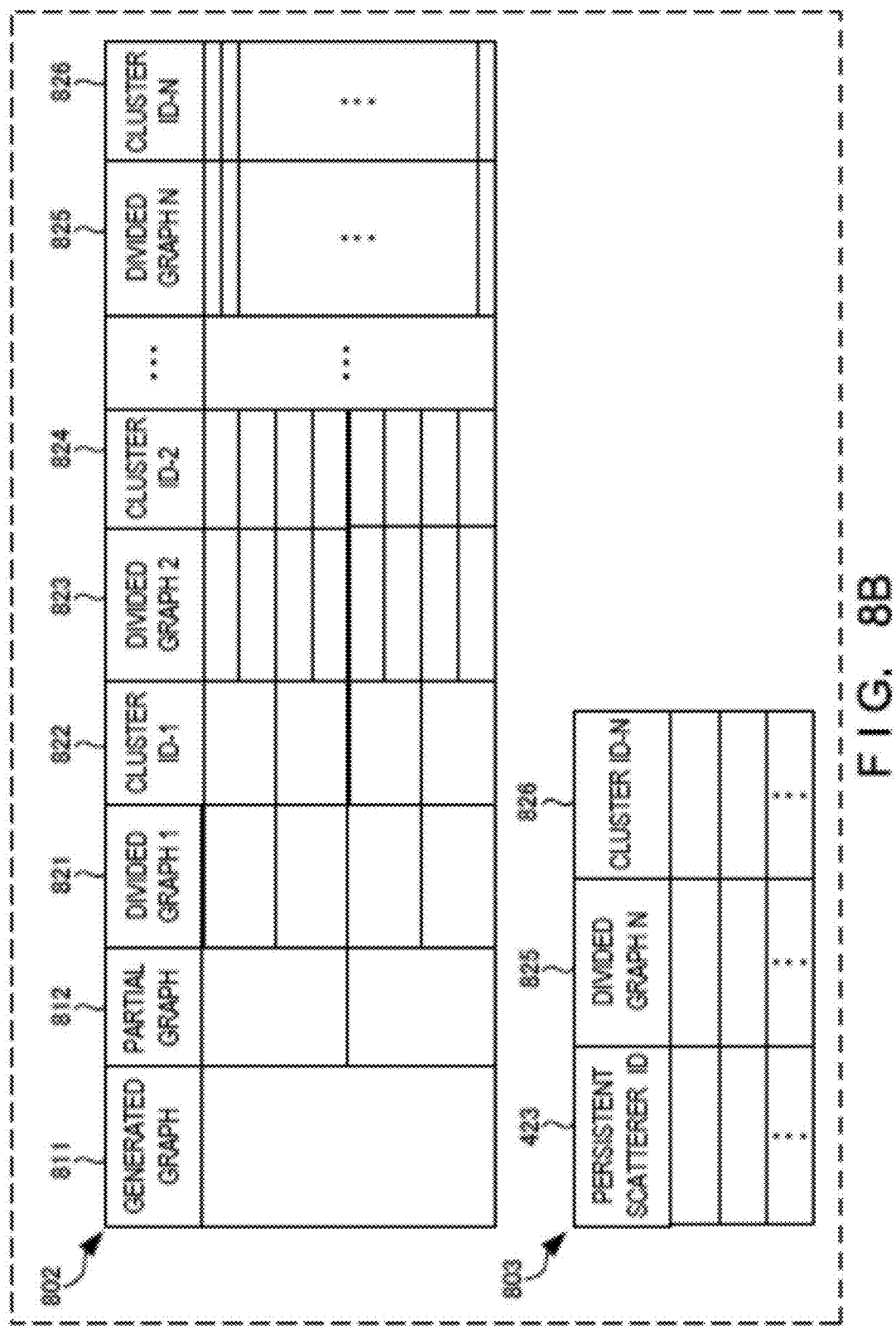
FIG. 8B is a view showing examples of a divided graph table and a cluster table, both of which are held by the image processing apparatus included in the image processing system according to the third example embodiment of the present invention.

FIG. 8B is a view showing examples of a divided graph table and a cluster table, both of which are held by the image processing apparatus included in the image processing system according to this example embodiment. A divided graph table 802 stores a divided graph 1 (821), a cluster ID-1 (822), a divided graph 2 (823), a cluster ID-2 (824), a divided graph N (825), and a cluster ID-N(826) in association with the generated graph 811. A cluster table 803 stores the divided graph N (825) and the cluster ID-N(826) in association with the persistent scatterer ID 423.

For example, the divided graph N (825) is generated by repeatedly dividing the generated graph 811 into two graphs a predetermined number of times. That is, in the initial state, each persistent scatterer is assigned in the generated graph. However, by dividing the generated graph into a plurality of graphs, similar persistent scatterers are clustered in the same cluster. Note that the example of dividing the generated graph into two graphs has been explained. However, division of the generated graph is not limited to division into two graphs, and may be, for example, division into three or more graphs.

Figure 9:
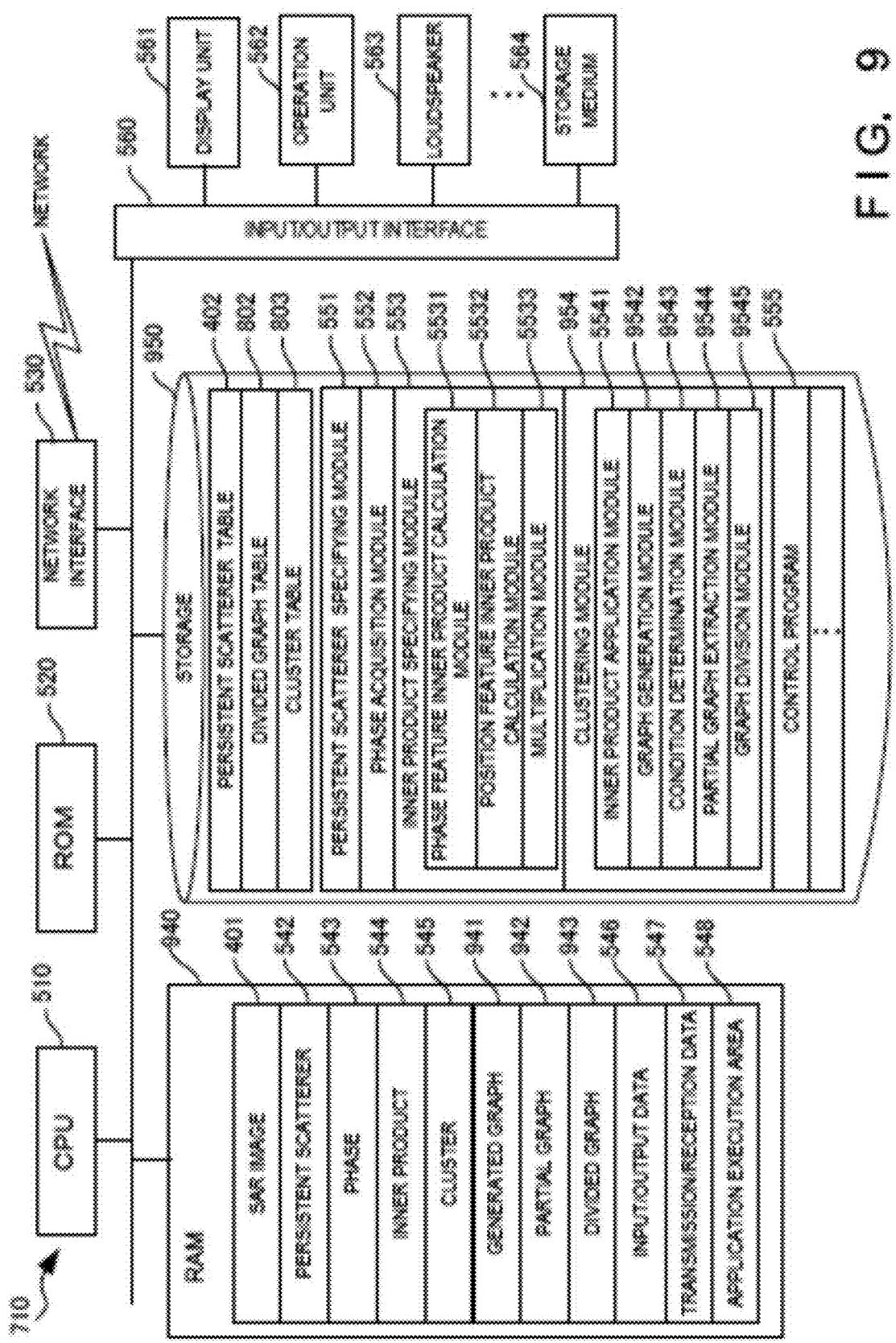
FIG. 9 is a block diagram showing the hardware arrangement of the image processing apparatus included in the image processing system according to the third example embodiment of the present invention.

FIG. 9 is a block diagram showing the hardware arrangement of the image processing apparatus included in the image processing system according to this example embodiment. A RAM 940 is a random access memory used as a temporary storage work area by a CPU 510. An area to store data necessary for implementation of this example embodiment is allocated to the RAM 940. A generated graph 941 is a graph generated by the graph generator 732. A partial graph 942 is a graph that is extracted by the partial graph extractor 735 and represents connection of persistent scatterers forming a cluster. A divided graph 943 is a graph divided by the graph divider 736.

A storage 950 stores a database, various parameters, or the following data or programs necessary for implementation of this example embodiment. The storage 950 stores the divided graph table 802 and the cluster table 803. The divided graph table 802 is the table, shown in FIG. 8B, for managing the relationship between the generated graph 811 and the divided graph 1 (821) and the like. The cluster table 803 is the table, shown in FIG. 8B, for managing the relationship between the persistent scatterer ID 423 and the cluster ID-N (826) and the like. The storage 950 further stores a clustering module 954, a graph generation module 9542, a condition determination module 9543, a partial graph extraction module 9544, and a graph division module 9545.

The graph generation module 9542 is a module that generates a weighted undirected graph that connects persistent scatterers. The condition determination module 9543 is a module that determines whether a cluster satisfies the end condition. The partial graph extraction module 9544 is a module that extracts a graph representing connection of persistent scatterers forming a cluster. The graph division module 9545 is a module that divides the partial graph based on the weights of edges. These modules 9542 to 9545 are read out into an application execution area 548 of the RAM 940 and executed by the CPU 510.

Figure 10A:
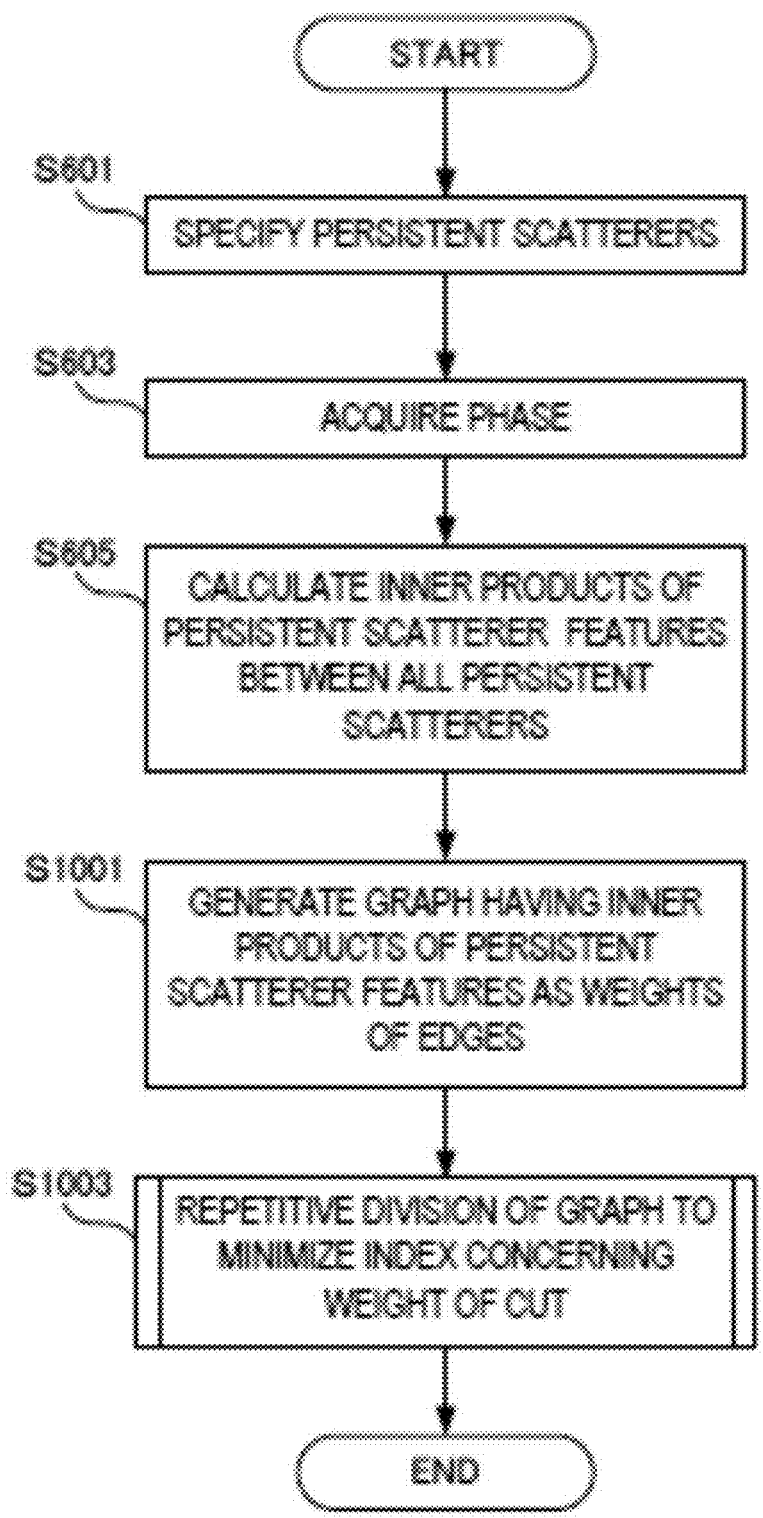
FIG. 10A is a flowchart for explaining the processing procedure of the image processing apparatus included in the image processing system according to the third example embodiment of the present invention.
Figure 10B:
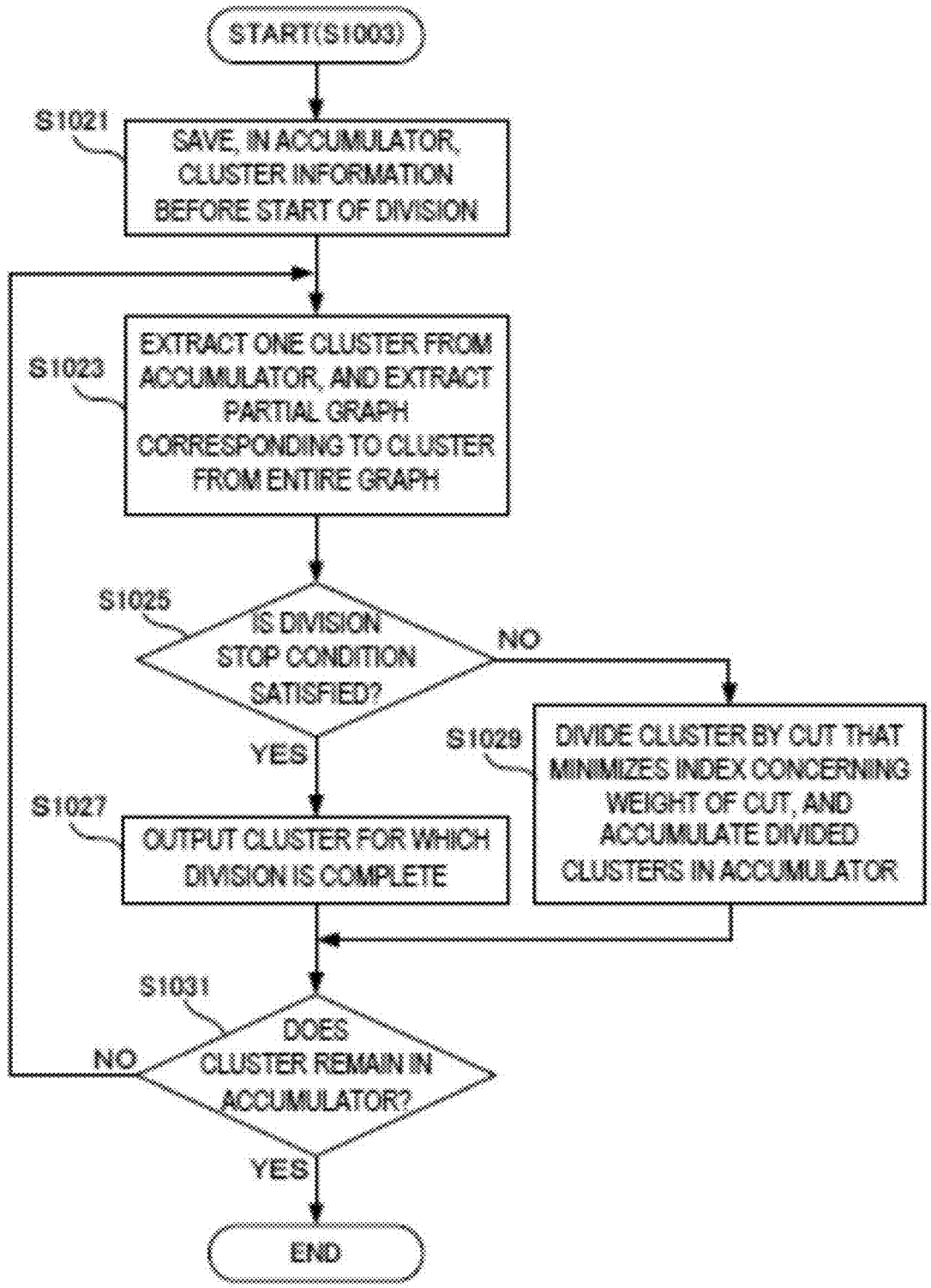
FIG. 10B is a flowchart for explaining the processing procedure of graph division by the image processing apparatus included in the image processing system according to the third example embodiment of the present invention.

FIG. 10A is a flowchart for explaining the processing procedure of the image processing apparatus included in the image processing system according to this example embodiment. FIG. 10B is a flowchart for explaining the processing procedure of graph division by the image processing apparatus included in the image processing system according to this example embodiment. These flowcharts are executed by the CPU 510 using the RAM 940, thereby implementing the functional components of the image processing apparatus 710 shown in FIG. 7.

In step S605, the inner product applier 731 of the image processing apparatus 710 calculates the inner products of persistent scatterer features between persistent scatterers using the inner product function specified by the inner product specifier 314. In step S1001, the graph generator 732 of the image processing apparatus 710 generates a graph having the above-described inner products as weights. In step S1003, the graph is repeatedly divided to minimize the index concerning the weight of the cut. A division result is output as clusters.

Repetitive division of the graph in step S1003 will be described next with reference to FIG. 10B. In step S1021, the image processing apparatus 710 accumulates, at the start of division, cluster information before the start of division in the cluster accumulator 733. As described above, one cluster having all the persistent scatterers as elements may be accumulated or clusters divided based on known information may be accumulated.

In step S1023, the image processing apparatus 710 extracts one cluster from the cluster accumulator 733, and extracts, from the graph concerning all the persistent scatterers calculated by the graph generator 732, a partial graph representing connection of persistent scatterers in the extracted cluster. The information of the extracted cluster is temporarily deleted from the cluster accumulator 733.

In step S1025, the condition determiner 734 of the image processing apparatus 710 determines whether the extracted cluster satisfies the division stop condition. As described above, division stop may be decided by some index representing the connection degree of the cluster components. Division stop may be decided when a specific repetition count is exceeded or may be decided based on the calculated number of clusters.

If the division stop condition is satisfied (YES in step S1025), the image processing apparatus 710 advances to step S1027. In step S1027, the image processing apparatus 710 outputs the cluster for which division is complete. In this case, the cluster is not returned into the cluster accumulator 733, and thus cluster assignment to the persistent scatterers belonging to the confirmed cluster remains unchanged thereafter.

If the division stop condition is not satisfied (NO in step S1025), the image processing apparatus 710 advances to step S1029. In step S1029, the image processing apparatus 710 divides the cluster by the cut that minimizes the index concerning the weight of the cut, and accumulates the divided clusters as new clusters in the cluster accumulator 733.

In step S1031, the image processing apparatus 710 determines whether a cluster remains in the cluster accumulator 733. If a cluster remains (YES in step S1031), the image processing apparatus 710 returns to step S1023 to divide the remaining cluster.

If no cluster remains (NO in step S1031), division of all the persistent scatterers into clusters is complete, and thus the image processing apparatus 710 ends the processing. The clusters sequentially output in this way correspond to a clustering result in this example embodiment.

According to this example embodiment, it is possible to flexibly set a condition for stopping division of a cluster, and surely guarantee that each cluster satisfies the condition. This can adjust the degree of coincidence of a cluster, to be extracted, with respect to a position, variation, and height. It is thus possible to adjust the detail of a structure to be extracted, that is, whether to extract the entire building or a fine three-dimensional structure of the building.

Fourth Example Embodiment

An image processing system according to the fourth example embodiment of the present invention will be described next with reference to FIG. 11. FIG. 11 is a block diagram showing the arrangement of the image processing system according to this example embodiment. The image processing system according to this example embodiment is different from that according to the above-described third example embodiment in that a division order recorder is provided. The remaining components and operations are similar to those in the second and third example embodiments. Hence, the same reference numerals denote the similar components and operations, and a detailed description thereof will be omitted.

An image processing system 1100 includes an image processing apparatus 1110 and a SAR image storage unit 320. The image processing apparatus 1110 includes a division order recorder 1111. The division order recorder 1111 receives cluster information before division and cluster information after division from a graph divider 736, and saves the division order of a specific cluster. As a saving format, for example, a tree structure can be used.

That is, a tree structure is created by setting a cluster before division as a parent node and clusters after division as child nodes. When clustering is finally completed, all performed divisions are saved. The record of the division order can be used to, for example, adjust the number of clusters after clustering. That is, for example, if it is determined that the number of divided clusters is too large, it is possible to extract a clustering result when the number of divided clusters is small by going up the tree structure.

According to this example embodiment, if it is determined that the number of divided clusters is too large, it is possible to adjust the clusters to larger clusters by following the division order. In addition, if it is desired to perform processing while changing the number of clusters, it is possible to process various numbers of clusters without performing calculation again by, in advance, dividing a cluster into a large number of clusters and obtaining a three structure according to this example embodiment. It is possible to appropriately extract a cluster of an entire building and narrow to a fine three-dimensional structure of the building.

Fifth Example Embodiment

Figure 12:
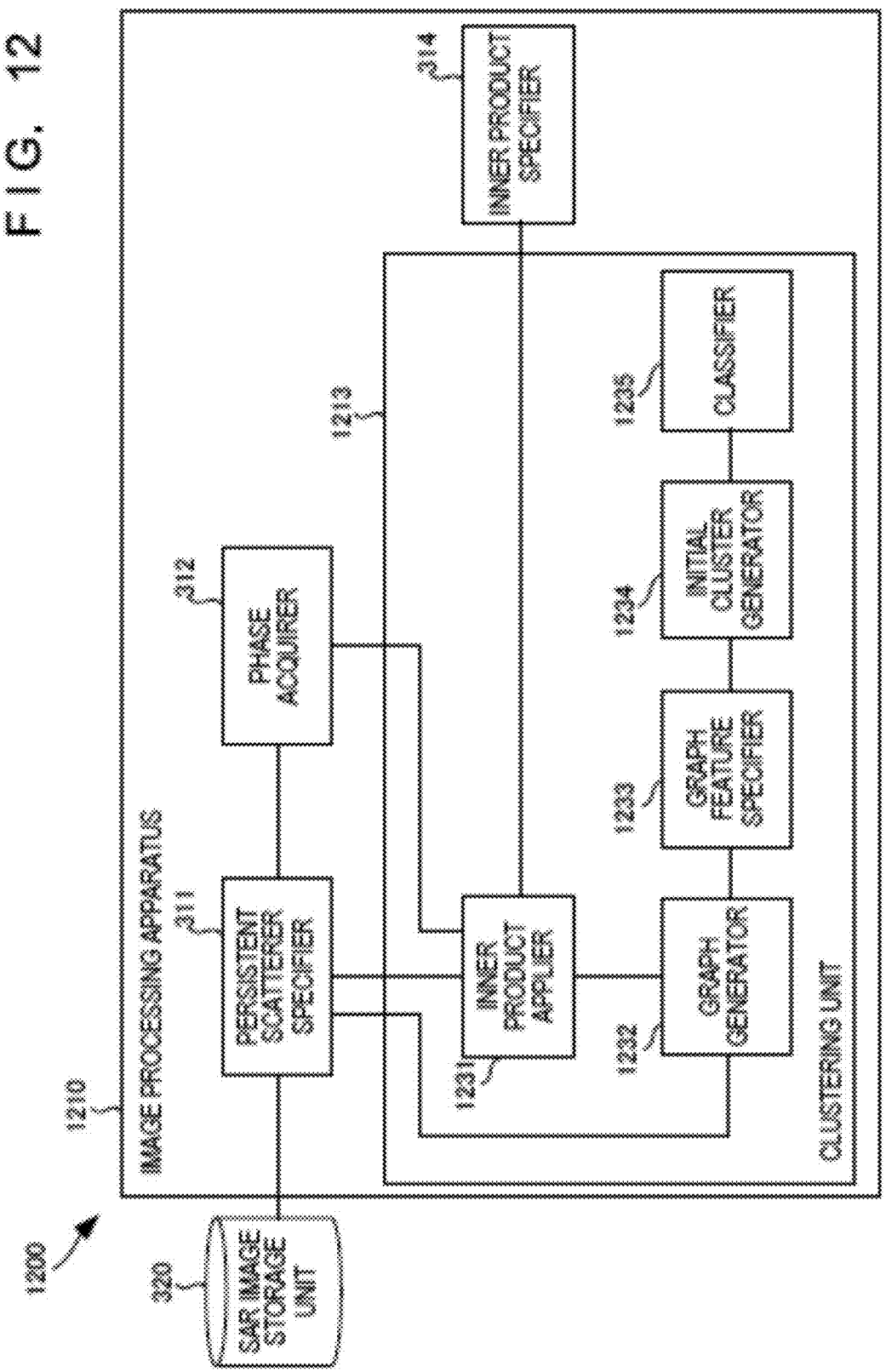
FIG. 12 is a block diagram showing the arrangement of an image processing system according to the fifth example embodiment of the present invention.

An image processing system according to the fifth example embodiment of the present invention will be described next with reference to FIGS. 12 to 13B. FIG. 12 is a block diagram for explaining the arrangement of the image processing system according to this example embodiment. The image processing system according to this example embodiment is different from those according to the above-described second to fourth example embodiments in that a clustering unit 1213 is provided instead of the clustering unit 313 and the clustering unit 713. The remaining components and operations are similar to those in the second to fourth example embodiments. Hence, the same reference numerals denote the similar components and operations, and a detailed description thereof will be omitted.

An image processing system 1200 includes an image processing apparatus 1210 and a SAR image storage unit 320. The image processing apparatus 1210 includes the clustering unit 1213. The clustering unit 1213 includes an inner product applier 1231, a graph generator 1232, a graph feature specifier 1233, an initial cluster generator 1234, and a classifier 1235.

The inner product applier 1231 calculates the inner product of persistent scatterer features for a pair of persistent scatterers. That is, the inner product applier 1231 calculates the inner product of persistent scatterer features between persistent scatterers, similar to the second example embodiment.

The graph generator 1232 generates a graph having persistent scatterers as nodes and the inner products of persistent scatterer features as the weights of edges. That is, the graph generator 1232 generates a weighted undirected graph that connects persistent scatterers, similar to the second example embodiment.

The graph feature specifier 1233 specifies, from the graph generated by the graph generator 1232, a feature at each persistent scatterer with respect to a connection on the graph. The graph feature is a feature concerning a connection from each persistent scatterer to another persistent scatterer. That is, persistent scatterers having similar graph features are often connected strongly. That is, for example, an amount called a graph spectrum is used. The graph spectrum is calculated as follows.

The total number of nodes on the graph is represented by M. $w_{i,j}$ represents the weight of an edge when a connection edge from a node i to a node j exists, and has a numerical value that becomes 0 when there is no connection. A matrix W is a square matrix of M rows×M columns and has $w_{i,j}$ as an element at the ith row and jth column. A matrix D is a diagonal matrix and has $\Sigma_j w_{i,j}$ as an element at the ith row and jth column.

At this time, the eigenvectors of a matrix D-W are sequentially acquired in ascending order of eigenvalues. When K represents the number of acquired eigenvectors, all the eigenvectors may be acquired to set K=M or K may be set to an appropriate number smaller than M.

The eigenvectors are represented in ascending order by:

$$v_1, v_2, \ldots, v_K \quad (15)$$

The eigenvectors given by $$v_1, v_2, \ldots, v_K \qquad (16)$$

are stored in a matrix of M rows×K columns as column vectors. The graph spectrum is given as the M row vectors.

Alternatively, a result of normalizing the graph spectrum by some method may be used. For example, when the above-described matrices W and D are used, K eigenvectors may be obtained by solving the following generalized eigenvalue problem using matrices D-W and D.

$$(D-W)v = \lambda Dv \qquad (17)$$

where $\lambda$ represents an eigenvalue. A normalized graph spectrum is obtained by extracting the row vectors of the matrix storing the eigenvectors in ascending order of the eigenvalues, similar to a case in which the graph spectrum is obtained.

The above graph spectrum or the like is obtained for the graph concerning the persistent scatterers and set as a graph feature at each persistent scatterer.

The initial cluster generator 1234 generates an initial cluster for each persistent scatterer. The initial cluster generator 1234 assigns the initial cluster to each persistent scatterer. As for distribution of the initial clusters, for example, initial clusters the number of which is designated in advance by a user or the like are generated.

If the number of initial clusters to be generated is not designated, the initial cluster generator 1234 may generate initial clusters by appropriately deciding the number of initial clusters to be generated. As for a method of assigning the initial clusters, the initial clusters may completely randomly be decided or may be decided so that the positions of the centers of the clusters are arranged at equal intervals as much as possible based on the positions of the persistent scatterers.

Some of the persistent scatterers whose graph features are away from each other as far as possible are selected based on the graph features calculated by the graph feature specifier 1233, and set as representative points of the clusters, and each persistent scatterer may be distributed to the cluster having the closest representative point in terms of the graph feature.

The classifier 1235 classifies each persistent scatterer based on the graph feature at each persistent scatterer. The classifier 1235 classifies each persistent scatterer using, for example, the K-means method as follows. The classifier 1235 obtains the centroid of the graph features for the cluster such as the initial cluster generated by the initial cluster generator 1234. The centroid of the graph features indicates a vector of the same dimension as that of the graph feature such that the sum of squares of the distances between the graph features for the persistent scatterers included in the cluster is smallest. That is, the centroid of the graph features is a vector at the center of the cluster in the viewpoint of the distance between the graph features.

The centroid of the graph features is obtained as, for example, the average of the graph features in the cluster. Alternatively, a weight based on some index may be applied to each point in advance, and the centroid may be obtained as a weighted average.

If the centroid of the graph features is obtained, the classifier 1235 obtains the Euclidean distance between the centroid of the graph features of each cluster and the graph feature of each persistent scatterer. The classifier 1235 reassigns each persistent scatterer to the cluster corresponding to the centroid of the graph features for which the distance between the graph features is shortest. This classification updates the persistent scatterers belonging to each cluster.

The classifier 1235 may repeatedly perform the above-described operations. That is, for each cluster in which the belonging persistent scatterers are reclassified and updated, the classifier 1235 reclassifies the cluster based on the distance between the centroid of the graph features and each persistent scatterer.

When the above-described processing is repeatedly performed, each of all the persistent scatterers is classified into the cluster such that the sum of squares of the distances between the graph features and the centroid of the graph features is smallest.

If, for example, the distance to the centroid remains unchanged by repeatedly performing the processing, the classifier 1235 determines that classification converges. Each cluster in this case is a clustering result. When a repetition count exceeds a specific count, it may be determined that classification converges by repeating the processing a sufficient number of times, and a clustering result may be output. Alternatively, if the number of persistent scatterers whose cluster assignment changes by repeating the processing is counted, and only a small number of persistent scatterers change, it may be determined that classification converges.

Figure 13B:
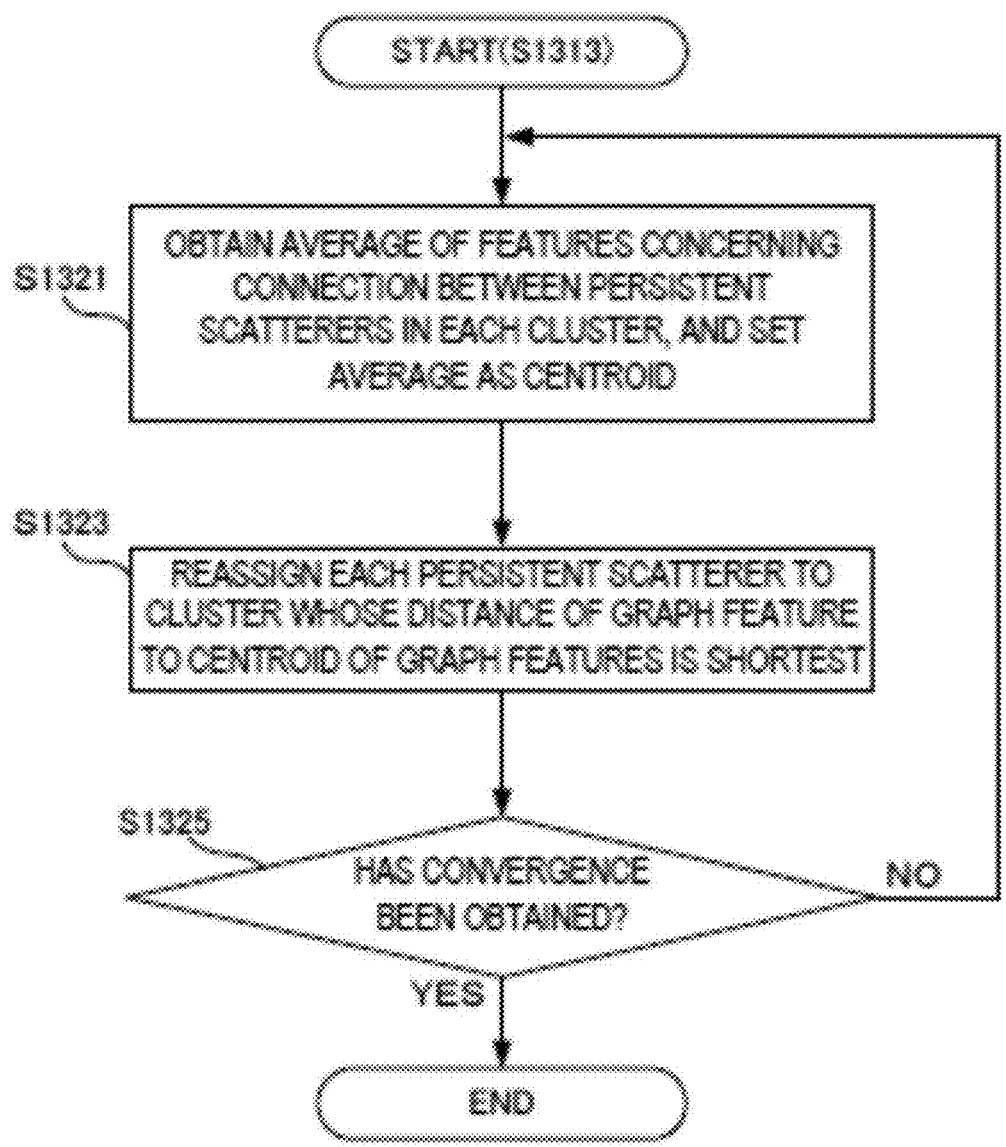
FIG. 13B is a flowchart for explaining the processing procedure of the image processing apparatus included in the image processing system according to the fifth example embodiment of the present invention.

FIG. 13A is a flowchart for explaining the processing procedure of the image processing apparatus included in the image processing system according to this example embodiment. FIG. 13B is a flowchart for explaining the processing procedure of the image processing apparatus included in the image processing system according to this example embodiment.

In step S1305, the inner product applier 1231 of the image processing apparatus 1210 calculates the inner products of persistent scatterer features between persistent scatterers. In step S1307, the image processing apparatus 1210 generates a graph having the calculated inner products as the weights of edges. In step S1309, the graph feature specifier 1233 of the image processing apparatus 1210 specifies the graph feature of each persistent scatterer.

In step S1311, the initial cluster generator 1234 of the image processing apparatus 1210 generates initial clusters. In step S1313, the classifier 1235 of the image processing apparatus 1210 classifies each persistent scatterer based on the graph feature, and outputs a classification result as a clustering result.

Classification of the graph feature will be described with reference to FIG. 13B. In step S1321, the image processing apparatus 1210 obtains the average of the features concerning the connections between the persistent scatterers in each cluster, that is, connection of each persistent scatterer to a specific persistent scatterer by an edge having a specific weight, thereby calculating a centroid. In step S1323, the image processing apparatus 1210 reassigns each persistent scatterer to a cluster whose distance of the graph feature to the centroid of the graph features is shortest. That is, the image processing apparatus 1210 searches for a centroid closest to the graph feature of each persistent scatterer, and reassigns each persistent scatterer to a cluster corresponding to the centroid. In step S1325, the image processing apparatus 1210 determines whether classification converges. If classification converges (YES in step S1325), the image processing apparatus 1210 ends the processing; otherwise (NO in step S1325), the image processing apparatus 1210 returns to step S1321. As described above, the thus obtained cluster is the cluster of each persistent scatterer.

According to this example embodiment, a correct clustering result is readily stably obtained due to the characteristic of the graph feature.

OTHER EXAMPLE EMBODIMENTS

Furthermore, the present invention is applicable to a program for processing displacement information and the like obtained from SAR images in association with data such as visible light images other than SAR data. The present invention can be used as a SAR image display device that can display a difference in structure by displaying a difference in cluster. In addition, the present invention is applicable to a SAR image processing program for performing analysis for each structure.

The present invention is also applicable to a synthetic aperture sonar using ultrasound waves.

The present invention is also applicable to a phase image captured by a time-of-flight camera. By performing observation at a plurality of times and applying the method according to the above-described example embodiment, it is possible to extract structures that perform similar movements.

The present invention is also applicable to the field of phase imaging using interference of coherent light. For example, by applying the method according to the above-described example embodiment to time-series phase changes of an image captured by a transmission-type phase imaging method used to measure a transparent object such as a glass or cell, it is possible to extract structures different in expansion coefficient. By performing image capturing while changing polarization and applying the method according to the above-described example embodiment to a plurality of phases at which polarization is observed, it is possible to cluster portions having similar anisotropies of refractive indices and use them for analysis of the material of the transparent object or generated stress/distortion. With respect to a reflection type, there is a method of analyzing a fine structure using optical heterodyne, and the method according to the above-described example embodiment is applicable.

By using a phase generated by interference of a pattern, an application to a visible intensity image is also possible. For example, there is provided a technique of capturing a periodic pattern by an imaging sensor and extracting information from the phase of an image. As a representative example, there is provided a sampling moire method of performing precise distortion measurement using a phase generated by interference between a target pattern and a periodic pattern generated by the element array of an image sensor. However, by applying the technique according to the above-described example embodiment, it is possible to estimate portions where similar distortions occur, and extract structures different in material. If a periodic pattern is irradiated, and a phase is captured at a plurality of positions, it is possible to extract a cluster for each captured solid.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

OTHER EXPRESSIONS OF EXAMPLE EMBODIMENTS

Some or all of the above-described example embodiments can also be described as in the following supplementary notes but are not limited to the followings.

Supplementary Note 1

There is provided an image processing apparatus comprising:
a persistent scatterer specifier that specifies persistent scatterers at which reflection is stable in a plurality of images and positions of the persistent scatterers;
a phase acquirer that acquires phases of the specified persistent scatterers; and
a clustering unit that clusters the persistent scatterers based on the positions of the persistent scatterers and the phases.

Supplementary Note 2

There is provided the image processing apparatus according to supplementary note 1, wherein the clustering unit further includes
a phase array acquirer that acquires phase arrays at the persistent scatterers,
a phase feature inner product calculator that specifies inner products of features of the phase arrays based on the phase arrays,
a position feature inner product calculator that specifies inner products of features of the positions of the persistent scatterers based on the positions, and
an integrator that integrates phase features and position features to output features of the persistent scatterers, and
the clustering unit clusters the persistent scatterers using the features of the persistent scatterers.

Supplementary Note 3

There is provided the image processing apparatus according to supplementary note 2, wherein the phase feature inner product specifier specifies the phase feature inner products based on correlations of the phases.

Supplementary Note 4

There is provided the image processing apparatus according to supplementary note 2 or 3, wherein the position feature inner product specifier specifies the position feature inner products using a monotonically decreasing exponential function with respect to Euclidean distances between the positions of the persistent scatterers.

Supplementary Note 5

There is provided the image processing apparatus according to any one of supplementary notes 1 to 4, wherein the clustering unit calculates a centroid of a cluster based on distances between features of persistent scatterers in the cluster, and updates, based on a distance between a feature at the calculated centroid and a feature at each persistent scatterer, a cluster to which the persistent scatterer belongs.

Supplementary Note 6

There is provided the image processing apparatus according to supplementary note 1, wherein
the clustering unit further includes a graph generator that generates a weighted graph of the persistent scatterers by setting the persistent scatterers as nodes and weighting each edge connecting the persistent scatterers, and
the persistent scatterers are clustered based on the generated weighted graph.

Supplementary Note 7

There is provided the image processing apparatus according to supplementary note 6, wherein
the clustering unit further includes a graph divider that divides the weighted graph based on the weights of the edges of the generated weighted graph, and
the persistent scatterers are clustered based on the divided graphs.

Supplementary Note 8

There is provided the image processing apparatus according to supplementary note 7, wherein the graph divider repeats division of the weighted graph a predetermined number of times.

Supplementary Note 9

There is provided the image processing apparatus according to any one of supplementary notes 5 to 8, wherein the clustering unit calculates a centroid of each of the clusters based on an average of features concerning connections between the persistent scatterers on the weighted graph.

Supplementary Note 10

There is provided the image processing apparatus according to any one of supplementary notes 1 to 9, wherein the clustering unit updates, based on a distance between the centroid of each cluster and each persistent scatterer, a cluster to which the persistent scatterer belongs.

Supplementary Note 11

There is provided the image processing apparatus according to any one of supplementary notes 1 to 10, further comprising an output unit that outputs information concerning the clustered persistent scatterers.

Supplementary Note 12

There is provided the image processing apparatus according to any one of supplementary notes 1 to 11, wherein the images are SAR images.

Supplementary Note 13

There is provided an image processing method comprising:
specifying persistent scatterers at which reflection is stable in a plurality of images and positions of the persistent scatterers;
acquiring phases of the specified persistent scatterers; and
clustering the persistent scatterers based on the positions of the persistent scatterers and the phases.

Supplementary Note 14

There is provided an image processing program for causing a computer to execute a method, comprising:
specifying persistent scatterers at which reflection is stable in a plurality of images and positions of the persistent scatterers;
acquiring phases of the specified persistent scatterers; and
clustering the persistent scatterers based on the positions of the persistent scatterers and the phases.

Supplementary Note 15

There is provided an image processing system comprising:
an image capturer that captures a plurality of images;
a storage unit that stores captured images;
an acquirer that acquires a plurality of images;
a persistent scatterer specifier that specifies persistent scatterers at which reflection is stable in a plurality of images and positions of the persistent scatterers;
a phase acquirer that acquires phases of the specified persistent scatterers; and
a clustering unit that clusters the persistent scatterers based on the positions of the persistent scatterers and the phases.

What is claimed is:
1. An image processing apparatus comprising:
a processor; and
a memory storing instructions executable by the processor to:
specify stable backscattering points at which reflection is stable in a plurality of SAR images and positions of the stable backscattering points;
acquire the positions of the stable backscattering points;
acquire phases of the stable backscattering points;
cluster the stable backscattering points within a plurality of clusters;
calculate a centroid of each cluster based on a first inner product of the stable backscattering points in the cluster; and
update, based on a second inner product between a centroid feature of the centroid of each cluster and a point feature of each stable backscattering point, the cluster to which the stable backscattering points belong.

2. The image processing apparatus according to claim 1, wherein the instructions are executable by the processor to further:
acquire phase arrays at the stable backscattering points;
specify third inner products of phase features of the phase arrays based on the phase arrays;
specify fourth inner products of position features of the positions of the stable backscattering points based on the positions; and
integrate the phase features and the position features to output the point feature of each stable backscattering point, wherein
the stable backscattering points are clustered using the point feature of each stable backscattering points.

3. The image processing apparatus according to claim 2, wherein the processor specifies the third inner products based on correlations of the phases.

4. The image processing apparatus according to claim 2, wherein the processor specifies the fourth inner products using a monotonically decreasing exponential function with respect to Euclidean distances between the positions of the stable backscattering points.

5. The image processing apparatus according to claim 1, wherein
the processor calculates the centroid of each cluster based on distances between the point feature of each stable backscattering point in the cluster, and
the processor updates, based on a distance between a centroid feature at the centroid of each cluster and the point feature of each stable backscattering point, the cluster to which the stable backscattering points belongs.

6. The image processing apparatus according to claim 1, wherein
the processor generates a weighted graph of the stable backscattering points by setting the stable backscattering points as nodes and weighting each of a plurality of edges connecting the stable backscattering points, and
the stable backscattering points are clustered based on the generated weighted graph.

7. The image processing apparatus according to claim 6, wherein
the processor divides the weighted graph based on weights of the edges of the generated weighted graph, and
the stable backscattering points are clustered based on the divided graph.

8. The image processing apparatus according to claim 7, wherein the processor repeats division of the weighted graph a predetermined number of times.

9. The image processing apparatus according to claim 6, wherein the processor calculates the centroid of each cluster based on an average of connection features concerning connections between the stable backscattering points on the weighted graph.

10. The image processing apparatus according to claim 1, wherein the processor updates, based on a distance between the centroid of each cluster and each stable backscattering point, the cluster to which the stable backscattering points belong.

11. The image processing apparatus according to claim 1, wherein the instructions are executable by the processor to further output information concerning the clustered stable backscattering points.

12. An image processing method comprising:
specifying stable backscattering points at which reflection is stable in a plurality of SAR images and positions of the stable backscattering points;
acquiring the positions of the stable backscattering points;
acquiring phases of the stable backscattering points;
clustering the stable backscattering points within a plurality of clusters;
calculating a centroid of each cluster based on a first inner product of the stable backscattering points in the cluster; and
updating, based on a second inner product between a centroid feature of the centroid of each cluster and a point feature of each stable backscattering point, the cluster to which the stable backscattering points belong.

13. A non-transitory computer readable medium storing a image processing program for causing a computer to execute a method comprising:
specifying stable backscattering points at which reflection is stable in a plurality of SAR images and positions of the stable backscattering points;
acquiring the positions of the stable backscattering points;
acquiring phases of the stable backscattering points;
clustering the stable backscattering points within a plurality of clusters;
calculating a centroid of each cluster based on a first inner product of the stable backscattering points in the cluster; and
updating, based on a second inner product between a centroid feature of the centroid of each cluster and a point feature of each stable backscattering point, the cluster to which the stable backscattering points belong.

* * * * *